(12) United States Patent
Ranjan et al.

(10) Patent No.: US 11,756,428 B2
(45) Date of Patent: Sep. 12, 2023

(54) RESOURCE TRANSPORTATION SYSTEMS AND METHODS

(71) Applicant: VORTO TECHNOLOGIES, LLC, Denver, CO (US)

(72) Inventors: Priyesh Ranjan, Denver, CO (US); Samuel Robert McLaughlin, Denver, CO (US)

(73) Assignee: Vorto Technologies, LLC, Denver, CO (US)

( * ) Notice: Subject to any disclaimer, the term of this patent is extended or adjusted under 35 U.S.C. 154(b) by 0 days.

(21) Appl. No.: 16/385,596

(22) Filed: Apr. 16, 2019

(65) Prior Publication Data

US 2019/0318629 A1  Oct. 17, 2019

Related U.S. Application Data

(60) Provisional application No. 62/789,294, filed on Jan. 7, 2019, provisional application No. 62/659,109, filed on Apr. 17, 2018.

(51) Int. Cl.
*G08G 1/00* (2006.01)
*G08G 1/0968* (2006.01)

(52) U.S. Cl.
CPC ....... *G08G 1/202* (2013.01); *G08G 1/096811* (2013.01); *G08G 1/096833* (2013.01); *G08G 1/207* (2013.01)

(58) Field of Classification Search
CPC ............. G08G 1/202; G08G 1/096811; G08G 1/096833; G08G 1/207; G08G 1/096844; G06Q 10/08; G06Q 10/063; G06Q 50/30; G06Q 50/28; G06Q 50/06; G06Q 50/02; G06Q 10/047
See application file for complete search history.

(56) References Cited

U.S. PATENT DOCUMENTS

| | | | | |
|---|---|---|---|---|
| 9,267,834 | B2* | 2/2016 | Chowdhary | G01F 23/303 |
| 2004/0220844 | A1* | 11/2004 | Sanville | G06Q 10/06316 |
| | | | | 705/7.26 |
| 2005/0034023 | A1* | 2/2005 | Maturana | G05B 15/02 |
| | | | | 714/37 |
| 2008/0125901 | A1* | 5/2008 | Fleischer | G06Q 10/08 |
| | | | | 700/215 |
| 2014/0012612 | A1* | 1/2014 | Abdic | G06Q 10/04 |
| | | | | 705/7.12 |

(Continued)

*Primary Examiner* — Faris S Almatrahi
*Assistant Examiner* — Abdalla A Khaled
(74) *Attorney, Agent, or Firm* — Wilmer Cutler Pickering Hale and Dorr LLP

(57) ABSTRACT

In some embodiments, a system for resource transportation comprises a routing command subsystem. In some embodiments, the routing command subsystem is configured to be communicably coupled to a first input device at a first location, the first input device configured to determine a first resource factor of a resource at the first location and a location input device associated with a transporter, the transporter configured to transport the resource, the location input device configured to determine a transporter location. In some embodiments, the routing command subsystem is further configured to change a first endpoint of a transporter route to a first alternate location based at least in part on the first resource factor and the transporter location.

75 Claims, 27 Drawing Sheets

(56) References Cited

U.S. PATENT DOCUMENTS

| | | | |
|---|---|---|---|
| 2015/0269521 A1* | 9/2015 | Knapp | G06Q 10/08355 |
| | | | 705/338 |
| 2016/0019497 A1* | 1/2016 | Carvajal | H04L 67/104 |
| | | | 705/333 |
| 2016/0071033 A1* | 3/2016 | Davis | G06Q 10/0832 |
| | | | 705/7.15 |
| 2016/0171440 A1* | 6/2016 | Durai Raj | G06Q 10/08355 |
| | | | 705/338 |
| 2016/0217399 A1* | 7/2016 | Roelofs | G06Q 10/063116 |
| 2017/0140317 A1* | 5/2017 | Vann | G06Q 10/08 |
| 2018/0158020 A1* | 6/2018 | Khasis | G01C 21/343 |
| 2018/0211217 A1* | 7/2018 | Berdinis | G05D 1/0291 |
| 2019/0066041 A1* | 2/2019 | Hance | G05D 1/021 |
| 2019/0206007 A1* | 7/2019 | Leach | G06F 16/23 |
| 2019/0236740 A1* | 8/2019 | Rao | G06N 20/20 |
| 2019/0325389 A1* | 10/2019 | Dearing | G06Q 10/08355 |

\* cited by examiner

Fig. 16

| | Input Data Example | Failure Point Indicated | Optimization to Reduce / Eliminate NPT and Demurrage |
|---|---|---|---|
| 1901 | Sensor: Frac Van Sensor data | Sand is running out at Well A | Route more trucks to Well A |
| 1902 | Sensor: Silo Sensor data Logistics App: Sand Mine Coordinator indicates Mine A is down in Logistics Module | Mine A is down | Route trucks from Mine A to Mine B |
| 1903 | Sensor: Waypoints from our Driver App | Long Wait Time at Mine A | Route trucks from Mine A to Mine B |
| 1904 | Sensor: Waypoints from our Driver App | Long Wait Time at Well A | Route trucks from Well A to Well B |
| 1905 | Logistics App: Well Site Coordinator updates app about well down due to wireline issues | Well A down | Route trucks from Well A to Well B |
| 1906 | Sand Mine Sensor: indicates one of the lanes at Mine A is down | Mine Lane Down | Route Trucks From Mine A to Mine B |

| | Input Data Example | Failure Point Indicated | Optimization to Reduce / Eliminate NPT and Demurrage |
|---|---|---|---|
| 2300 | | | |
| 2301 | Sand Mine Sensor: indicates Distant Mine C is down | Distant Mine C is Down | Re-route rail traffic to other distant mines. Change drop-off location for sand to another local mine or transload and reroute trucks. |
| 2302 | Sensor: Waypoints from our Driver App | Long Wait Time at Transload C | Change pickup location for sand to another local mine or transload and reroute trucks. |
| 2303 | Sensor: Frac Van Sensor data | Well G is Down | Reroute trucks to different wells. |

Fig. 23

RESOURCE TRANSPORTATION SYSTEMS AND METHODS

CROSS-REFERENCE TO RELATED APPLICATIONS

This application claims priority to U.S. Provisional Application No. 62/659,109 filed on Apr. 17, 2018 entitled "Logistics System" and U.S. Provisional Application No. 62/789,294 filed on Jan. 7, 2019 entitled "Resource Transportation Systems and Method," each of which is incorporated herein by reference.

TECHNICAL FIELD

Embodiments relate to resource transportation systems.

BACKGROUND

For various applications, such as hydraulic fracturing, it is desirable to transport sand and other materials from sources such as mines to destinations such as wells. In conventional systems, a fixed number of transports deliver the materials from sources to destinations according to fixed routes and schedules. This can result in inefficiencies and underutilization of transportation resources. In some embodiments, the systems and methods described herein overcome these and other problems.

SUMMARY

In some embodiments, a system for resource transportation comprises a routing command subsystem. In some embodiments, the routing command subsystem is configured to be communicably coupled to a first input device at a first location, the first input device configured to determine a first resource factor of a resource at the first location and a location input device associated with a transporter, the transporter configured to transport the resource, the location input device configured to determine a transporter location. In some embodiments, the routing command subsystem is further configured to change a first endpoint of a transporter route to a first alternate location based at least in part on the first resource factor and the transporter location.

In some embodiments, the first location comprises a supply node. In some embodiments, the first location comprises a demand node. In some embodiments, system further comprises a second input device at a second location, the second input device configured to determine a second resource factor at the second location. In some embodiments, the changing the first endpoint of the transporter route further comprises changing the first endpoint of the transporter route to the first alternate location based at least in part on the second resource factor.

In some embodiments, the first location comprises a source node and the second location comprises a destination node. In some embodiments, the first input device comprises a sensor. In some embodiments, the first input device comprises a data entry device. In some embodiments, the location input device comprises a sensor. In some embodiments, the location input device comprises a data entry device.

In some embodiments, the first resource factor comprises an amount of the resource. In some embodiments, the amount of the resource comprises a quantity of the resource at the first location. In some embodiments, the amount of the resource comprises a quantity of the resource consumed at the first location. In some embodiments, the first resource factor comprises a rate of change of the resource. In some embodiments, the first resource factor comprises a comparison of a quantity of the resource withdrawn at a supply node with a scheduled demand for the resource at a demand node.

In some embodiments, the first input device determines the first resource factor based at least in part on a real-time input. In some embodiments, the first input device determines the first resource factor based at least in part on a periodic input. In some embodiments, the location input device determines the transporter location based at least in part on a real-time input. In some embodiments, the location input device determines the transporter location based at least in part on a periodic input.

In some embodiments, the system further comprises a second input device associated with the transporter, the second input device configured to determine a second resource factor of the resource associated with the transporter. In some embodiments, the second resource factor comprises an amount of the resource transported by the transporter. In some embodiments, the first endpoint of the transporter route comprises a supply node. In some embodiments, the first endpoint the transporter route comprises a demand node.

In some embodiments, the routing command subsystem is further configured to determine a transporter resource factor, wherein the transporter resource factor comprises a number of transporters transporting the resource. In some embodiments, the routing command subsystem is further configured to direct a second transporter to transport the resource based at least in part on the first resource factor and the transporter location. In some embodiments, the routing command subsystem is further configured to change a schedule for the transporter to transport the resource based at least in part on the first resource factor and the transporter location.

In some embodiments, the routing command subsystem is further configured to change a route of the transporter to include a first intermediate location based at least in part on the first resource factor and the transporter location. In some embodiments, the changing the first endpoint of the transporter route further comprises predicting an availability of the resource at a supply node. In some embodiments, the changing the first endpoint of the transporter route further comprises predicting a demand of the resource at a demand node. In some embodiments, the changing the first endpoint of the transporter route further comprises predicting a number of transporters available to transport the resource.

In some embodiments, the first resource factor depends on a second resource factor associated with a second resource. In some embodiments, the resource comprises at least one sand, chemicals, water, oil, gas, equipment, or personnel. In some embodiments, the transporter comprises at least one of a rail car, a truck, or pipeline. In some embodiments, the first input device comprises at least one of a node site sensor, a fracking van sensor, or a supply node sensor. In some embodiments, the routing command subsystem is further configured to change the first endpoint of the transporter route to the first alternate location based at least in part on the first resource factor, the transporter location, and a driver factor. In some embodiments, the driver factor comprises at least one of a current duty status or a number of hours of service remaining.

In some embodiments, a system for resource transportation comprises a driver selection subsystem configured to be communicably coupled to a first input device at a first location, the first input device configured to determine a first resource factor of a resource at the first location; a location input device associated with a transporter, the location input device configured to determine a transporter location; a first driver input device associated with a first driver, the first driver input device configured to determine a first driver factor; and a second driver input device associated with a second driver, the second driver input device configured to determine a second driver factor. In some embodiments, the driver selection subsystem is further configured to associate at least one of the first driver or the second driver with the transporter based at least in part on the first resource factor, the transporter location, the first driver factor, and the second driver factor.

In some embodiments, the first location comprises a supply node. In some embodiments, the first location comprises a demand node. In some embodiments, the first input device comprises a sensor. In some embodiments, the first input device comprises a data entry device. In some embodiments, the location input device comprises a sensor. In some embodiments, the location input device comprises a data entry device. In some embodiments, the first driver input device comprises a sensor. In some embodiments, the first driver input device comprises a data entry device. In some embodiments, the second driver input device comprises a sensor. In some embodiments, the second driver input device comprises a data entry device.

In some embodiments, the first resource factor comprises an amount of the resource. In some embodiments, the amount of the resource comprises a quantity of the resource at the first location. In some embodiments, the amount of the resource comprises a quantity of the resource consumed at the first location. In some embodiments, the first resource factor comprises a rate of change of the resource. In some embodiments, the first resource factor comprises a comparison of a quantity of the resource withdrawn at a supply node with a scheduled demand for the resource at a demand node.

In some embodiments, the first input device determines the first resource factor based at least in part on a real-time input. In some embodiments, the first input device determines the first resource factor based at least in part on a periodic input. In some embodiments, the location input device determines the transporter location based at least in part on a real-time input. In some embodiments, the location input device determines the transporter location based at least in part on a periodic input.

In some embodiments, the system further comprises a second input device associated with the transporter, the second input device configured to determine a second resource factor of the resource associated with the transporter. In some embodiments, the system further comprises the second resource factor comprises an amount of the resource transported by the transporter.

In some embodiments, the driver selection subsystem is further configured to determine a transporter resource factor, wherein the transporter resource factor comprises a number of transporters transporting the resource. In some embodiments, the driver selection subsystem is further configured to direct a second transporter to transport the resource based at least in part on the first resource factor and the transporter location. In some embodiments, the driver selection subsystem is further configured to change a schedule for the transporter to transport the resource based at least in part on the first resource factor and the transporter location. In some embodiments, the driver selection subsystem is further configured to change a route of the transporter to include a first intermediate location based at least in part on the first resource factor and the transporter location.

In some embodiments, the first resource factor depends on a second resource factor associated with a second resource. In some embodiments, the resource comprises at least one sand, chemicals, water, oil, gas, equipment, or personnel. In some embodiments, the transporter comprises at least one of a rail car, a truck, or pipeline. In some embodiments, the first input device comprises at least one of a node site sensor, a fracking van sensor, or a supply node sensor. In some embodiments, the first driver factor comprises at least one of a first current duty status or a first number of hours of service remaining. In some embodiments, the second driver factor comprises at least one of a first current duty status or a first number of hours of service remaining.

In some embodiments, a system for resource transportation comprises a transporter selection subsystem configured to be communicably coupled to: a first input device at a first location, the first input device configured to determine a first resource factor of a resource at the first location; a first location input device associated with a first transporter, the first location input device configured to determine a first transporter location; a second location input device associated with a second transporter, the first location input device configured to determine a second transporter location; a driver input device associated with a driver, the driver input device configured to determine a driver factor. In some embodiments, the transporter selection subsystem is further configured to select at least one of the first transporter or the second transporter to transport the resource based at least in part on the first resource factor, the first transporter location, the second transporter location, and the driver factor.

In some embodiments, the first location comprises a supply node. In some embodiments, the first location comprises a demand node. In some embodiments, the first input device comprises a sensor. In some embodiments, the first input device comprises a data entry device. In some embodiments, the first location input device comprises a sensor. In some embodiments, the first location input device comprises a data entry device. In some embodiments, the second location input device comprises a sensor. In some embodiments, the second location input device comprises a data entry device.

In some embodiments, the first resource factor comprises an amount of the resource. In some embodiments, the amount of the resource comprises a quantity of the resource at the first location. In some embodiments, the amount of the resource comprises a quantity of the resource consumed at the first location. In some embodiments, the first resource factor comprises a rate of change of the resource. In some embodiments, the first resource factor comprises a comparison of a quantity of the resource withdrawn at a supply node with a scheduled demand for the resource at a demand node.

In some embodiments, the first input device determines the first resource factor based at least in part on a real-time input. In some embodiments, the first input device determines the first resource factor based at least in part on a periodic input. In some embodiments, the first location input device determines the transporter location based at least in part on a real-time input. In some embodiments, the first location input device determines the transporter location based at least in part on a periodic input. In some embodiments, the second location input device determines the transporter location based at least in part on a real-time input.

In some embodiments, the second location input device determines the transporter location based at least in part on a periodic input. In some embodiments, the system further comprises a second input device associated with the transporter, the second input device configured to determine a second resource factor of the resource associated with the transporter. In some embodiments, the second resource factor comprises an amount of the resource transported by the transporter. In some embodiments, the transporter selection subsystem is further configured to determine a transporter resource factor, wherein the transporter resource factor comprises a number of transporters transporting the resource.

In some embodiments, the transporter selection subsystem is further configured to direct a second transporter to transport the resource based at least in part on the first resource factor and the first transporter location. In some embodiments, the transporter selection subsystem is further configured to change a schedule for the transporter to transport the resource based at least in part on the first resource factor and the first transporter location. In some embodiments, the routing command subsystem is further configured to change a route of the transporter to include a first intermediate location based at least in part on the first resource factor and the first transporter location.

In some embodiments, the first resource factor depends on a second resource factor associated with a second resource. In some embodiments, the resource comprises at least one sand, chemicals, water, oil, gas, equipment, or personnel. In some embodiments, the first transporter comprises at least one of a rail car, a truck, or pipeline. In some embodiments, the first input device comprises at least one of a node site sensor, a fracking van sensor, or a supply node sensor. In some embodiments, the driver factor comprises at least one of a current duty status or a number of hours of service remaining.

In some embodiments, a system for resource transportation comprises a predictive utilization subsystem configured to be communicably coupled to: a first input device at a first location, the first input device configured to determine a first resource factor of a resource at the first location, wherein the first location comprises a demand node; a second input device, the second input device configured to determine a second factor; the predictive utilization subsystem is further configured to predict availability based at least in part on the first resource factor and the second factor.

In some embodiments, the second factor comprises a supply of the resource at a supply node. In some embodiments, the second factor comprises a supply of the resource at an intermediary node. In some embodiments, the second factor comprises a number of transporters transporting the resource. In some embodiments, availability comprises a predicted availability of the resource at a supply node. In some embodiments, availability comprises a predicted availability of the resource at an intermediary node. In some embodiments, the availability comprises a predicted availability of transporters to transport the resource. In some embodiments, availability comprises a predicted availability of the resource at the demand node. In some embodiments, availability comprises a predicted demand of the resource at the demand node.

In some embodiments, the first input device comprises a sensor. In some embodiments, the first input device comprises a data entry device. In some embodiments, the second input device comprises a sensor. In some embodiments, the second input device comprises a data entry device. In some embodiments, the first resource factor comprises an amount of the resource. In some embodiments, the first resource factor comprises a rate of change of the resource. In some embodiments, the first resource factor comprises a comparison of a quantity of the resource withdrawn at a supply node with a scheduled demand for the resource at a demand node.

In some embodiments, the first input device determines the first resource factor based at least in part on a real-time input. In some embodiments, the first input device determines the first resource factor based at least in part on a periodic input. In some embodiments, the second input device determines the second resource factor based at least in part on a real-time input. In some embodiments, the second input device determines the second resource factor based at least in part on a periodic input.

In some embodiments, the system further comprises a third input device associated with the transporter, the third input device configured to determine a third resource factor of the resource associated with the transporter. In some embodiments, the third resource factor comprises an amount of the resource transported by the transporter. In some embodiments, the first resource factor depends on a third resource factor associated with a second resource. In some embodiments, the second resource factor depends on a third resource factor associated with a second resource.

In some embodiments, a method for resource transportation comprises determining a first resource factor of a resource at a first location; determining a transporter location of a transporter configured to transport the resource; and changing a first endpoint of a transporter route to a first alternate location based at least in part on the first resource factor and the transporter location.

In some embodiments, the first location comprises a supply node. In some embodiments, the first location comprises a demand node. In some embodiments, the method further comprises determining a second resource factor at the second location; wherein the changing the first endpoint of the transporter route further comprise changing the first endpoint of the transporter route to the first alternate location based at least in part on the second resource factor. In some embodiments, the first location comprises a source node and the second location comprises a destination node.

In some embodiments, determining the first resource factor of the resource at the first location comprises determining the first resource factor at least in part using a first input device. In some embodiments, the first input device comprises a sensor. In some embodiments, the first input device comprises a data entry device. In some embodiments, determining the transporter location of the transporter configured to transport the resource comprises determining the transporter location using a first location input device.

In some embodiments, the location input device comprises a sensor. In some embodiments, the location input device comprises a data entry device. In some embodiments, the first resource factor comprises an amount of the resource. In some embodiments, the amount of the resource comprises a quantity of the resource at the first location. In some embodiments, the amount of the resource comprises a quantity of the resource consumed at the first location. In some embodiments, the first resource factor comprises a rate of change of the resource. In some embodiments, the first resource factor comprises a comparison of a quantity of the resource withdrawn at a supply node with a scheduled demand for the resource at a demand node.

In some embodiments, determining the first resource factor comprises determining the first resource factor based at least in part on a real-time input. In some embodiments, determining the first resource factor comprises determining the first resource factor based at least in part on a periodic input. In some embodiments, determining the transporter location comprises determining the transporter location based at least in part on a real-time input. In some embodiments, determining the transporter location comprises determining the transporter location based at least in part on a periodic input.

In some embodiments, the method further comprises determining a second resource factor of the resource associated with the transporter. In some embodiments, the second resource factor comprises an amount of the resource transported by the transporter. In some embodiments, the first endpoint of the transporter route comprises a supply node. In some embodiments, the first endpoint the transporter route comprises a demand node.

In some embodiments, the method further comprises determining a transporter resource factor, wherein the transporter resource factor comprises a number of transporters transporting the resource. In some embodiments, the method further comprises directing a second transporter to transport the resource based at least in part on the first resource factor and the transporter location.

In some embodiments, the method further comprises changing a schedule for the transporter to transport the resource based at least in part on the first resource factor and the transporter location. In some embodiments, the method further comprises changing a route of the transporter to include a first intermediate location based at least in part on the first resource factor and the transporter location. In some embodiments, the changing the first endpoint of the transporter route further comprises predicting an availability of the resource at a supply node. In some embodiments, the changing the first endpoint of the transporter route further comprises predicting a demand of the resource at a demand node. In some embodiments, the changing the first endpoint of the transporter route further comprises predicting a number of transporters available to transport the resource.

In some embodiments, the first resource factor depends on a second resource factor associated with a second resource. In some embodiments, the resource comprises at least one sand, chemicals, water, oil, gas, equipment, or personnel. In some embodiments, the transporter comprises at least one of a rail car, a truck, or pipeline.

In some embodiments, determining the first resource factor of the resource at the first location comprises determining the first resource factor at least in part using a first input device and wherein the first input device comprises at least one of a node site sensor, a fracking van sensor, or a supply node sensor. In some embodiments, the method further comprises changing the first endpoint of the transporter route to the first alternate location based at least in part on the first resource factor, the transporter location, and a driver factor. In some embodiments, the driver factor comprises at least one of a current duty status or a number of hours of service remaining.

In some embodiments, a method for resource transportation comprises determining a first resource factor of a resource at a first location; determining a transporter location of a transporter; determining a first driver factor for a first driver; determining a second driver factor for a second driver; and associating at least one of the first driver or the second driver with the transporter based at least in part on the first resource factor, the transporter location, the first driver factor, and the second driver factor.

In some embodiments, the first location comprises a supply node. In some embodiments, the first location comprises a demand node. In some embodiments, determining the first resource factor comprises determining the first resource factor at least in part using a first input device. In some embodiments, the first input device comprises a sensor. In some embodiments, the first input device comprises a data entry device. In some embodiments, determining the transporter location comprises determining the transporter location at least in part using a location input device. In some embodiments, the location input device comprises a sensor. In some embodiments, the location input device comprises a data entry device.

In some embodiments, determining the first driver factor comprises determining the first driver factor at least in part using a first driver input device. In some embodiments, the first driver input device comprises a sensor. In some embodiments, the first driver input device comprises a data entry device. In some embodiments, determining the second driver factor comprises determining the second driver factor at least in part using a second driver input device. In some embodiments, the second driver input device comprises a sensor. In some embodiments, the second driver input device comprises a data entry device.

In some embodiments, the first resource factor comprises an amount of the resource. In some embodiments, the amount of the resource comprises a quantity of the resource at the first location. In some embodiments, the amount of the resource comprises a quantity of the resource consumed at the first location. In some embodiments, the first resource factor comprises a rate of change of the resource. In some embodiments, the first resource factor comprises a comparison of a quantity of the resource withdrawn at a supply node with a scheduled demand for the resource at a demand node.

In some embodiments, the method further comprises determining the first resource factor based at least in part on a real-time input. In some embodiments, the method further comprises determining the first resource factor based at least in part on a periodic input. In some embodiments, the method further comprises determining the transporter location based at least in part on a real-time input. In some embodiments, the method further comprises determining the transporter location based at least in part on a periodic input. In some embodiments, the method further comprises determining a second resource factor of the resource associated with the transporter.

In some embodiments, the second resource factor comprises an amount of the resource transported by the transporter. In some embodiments, the method further comprises determining a transporter resource factor, wherein the transporter resource factor comprises a number of transporters transporting the resource. In some embodiments, the method further comprises directing a second transporter to transport the resource based at least in part on the first resource factor and the transporter location.

In some embodiments, the method further comprises changing a schedule for the transporter to transport the resource based at least in part on the first resource factor and the transporter location. In some embodiments, the method further comprises changing a route of the transporter to include a first intermediate location based at least in part on the first resource factor and the transporter location. In some embodiments, the first resource factor depends on a second resource factor associated with a second resource.

In some embodiments, the resource comprises at least one sand, chemicals, water, oil, gas, equipment, or personnel. In some embodiments, the transporter comprises at least one of a rail car, a truck, or pipeline. In some embodiments, the first driver factor comprises at least one of a first current duty status or a first number of hours of service remaining. In some embodiments, the second driver factor comprises at least one of a first current duty status or a first number of hours of service remaining.

In some embodiments, method for resource transportation comprises determining a first resource factor of a resource at a first location; determining a first transporter location for a first transporter; determining a second transporter location for a second transporter; determining a driver factor for a driver; and selecting at least one of the first transporter or the second transporter to transport the resource based at least in part on the first resource factor, the first transporter location, the second transporter location, and the driver factor.

In some embodiments, the first location comprises a supply node. In some embodiments, the first location comprises a demand node. In some embodiments, determining the first resource factor comprises determining the first resource factor at least in part using a first input device. In some embodiments, the first input device comprises a sensor. In some embodiments, the first input device comprises a data entry device. In some embodiments, determining the first transporter location comprises determining the transporter location at least in part using a first location input device.

In some embodiments, the first location input device comprises a sensor. In some embodiments, the first location input device comprises a data entry device. In some embodiments, determining the second transporter location comprises determining the transporter location at least in part using a second location input device. In some embodiments, the second location input device comprises a sensor. In some embodiments, the second location input device comprises a data entry device. In some embodiments, the first resource factor comprises an amount of the resource. In some embodiments, the amount of the resource comprises a quantity of the resource at the first location. In some embodiments, the amount of the resource comprises a quantity of the resource consumed at the first location.

In some embodiments, the first resource factor comprises a rate of change of the resource. In some embodiments, the first resource factor comprises a comparison of a quantity of the resource withdrawn at a supply node with a scheduled demand for the resource at a demand node. In some embodiments, the method further comprises determining the first resource factor based at least in part on a real-time input. In some embodiments, the method further comprises the first resource factor based at least in part on a periodic input. In some embodiments, the method further comprises determining the transporter location based at least in part on a real-time input. In some embodiments, the method further comprises determining the transporter location based at least in part on a periodic input. In some embodiments, the method further comprises determining the transporter location based at least in part on a real-time input. In some embodiments, the method further comprises determining the transporter location based at least in part on a periodic input. In some embodiments, the method further comprises determining a second resource factor of the resource associated with the transporter.

In some embodiments, the second resource factor comprises an amount of the resource transported by the transporter. In some embodiments, the method further comprises determining a transporter resource factor, wherein the transporter resource factor comprises a number of transporters transporting the resource. In some embodiments, the method further comprises directing a second transporter to transport the resource based at least in part on the first resource factor and the first transporter location. In some embodiments, the method further comprises changing a schedule for the transporter to transport the resource based at least in part on the first resource factor and the first transporter location.

In some embodiments, the method further comprises changing a route of the transporter to include a first intermediate location based at least in part on the first resource factor and the first transporter location. In some embodiments, the first resource factor depends on a second resource factor associated with a second resource. In some embodiments, the resource comprises at least one sand, chemicals, water, oil, gas, equipment, or personnel. In some embodiments, the first transporter comprises at least one of a rail car, a truck, or pipeline. In some embodiments, the driver factor comprises at least one of a current duty status or a number of hours of service remaining.

In some embodiments, a method for resource transportation comprises determining a first resource factor of a resource at a first location, wherein the first location comprises a demand node; determining a second factor; and predicting availability based at least in part on the first resource factor and the second factor.

In some embodiments, the second factor comprises a supply of the resource at a supply node. In some embodiments, the second factor comprises a supply of the resource at an intermediary node. In some embodiments, the second factor comprises a number of transporters transporting the resource. In some embodiments, availability comprises a predicted availability of the resource at a supply node. In some embodiments, availability comprises a predicted availability of the resource at an intermediary node. In some embodiments, availability comprises a predicted availability of transporters to transport the resource. In some embodiments, availability comprises a predicted availability of the resource at the demand node. In some embodiments, availability comprises a predicted demand of the resource at the demand node.

In some embodiments, determining the first resource factor comprises determining the first resource factor at least in part using a first input device. In some embodiments, first input device comprises a sensor. In some embodiments, the first input device comprises a data entry device. In some embodiments, determining the second resource factor comprises determining the second resource factor at least in part using a second input device. In some embodiments, the second input device comprises a sensor. In some embodiments, the second input device comprises a data entry device. In some embodiments, the first resource factor comprises an amount of the resource. In some embodiments, the first resource factor comprises a rate of change of the resource. In some embodiments, the first resource factor comprises a comparison of a quantity of the resource withdrawn at a supply node with a scheduled demand for the resource at a demand node.

In some embodiments, the method further comprises determining the first resource factor based at least in part on a real-time input. In some embodiments, the method further comprises determining the first resource factor based at least in part on a periodic input. In some embodiments, the method further comprises determining the second resource factor based at least in part on a real-time input. In some embodiments, the method further comprises determining the second resource factor based at least in part on a periodic input. In some embodiments, the method further comprises determining a third resource factor of the resource associated with the transporter. In some embodiments, the third resource factor comprises an amount of the resource transported by the transporter. In some embodiments, the first resource factor depends on a third resource factor associated with a second resource. In some embodiments, the second resource factor depends on a third resource factor associated with a second resource.

In some embodiments, a system for resource transportation comprises: a production operation at a first location, the production operation using a resource at a use rate that varies over time, wherein the use rate further depends on availability of other resources at the first location; an amount sensor at the production operation, the amount sensor configured to determine an amount of the resource at the production operation; a source repository of the resource at a second location remote from the first location; a transporter configured to transport the resource; a location sensor associated with the transporter, the location sensor configured to determine a transporter location; and a control system communicably coupled to the location sensor and the amount sensor. In some embodiments, the control system is further configured to receive information about the use rate, and to reroute the transporter to one of the first location and the second location based at least in part on the amount, the use rate, and the transporter location.

In some embodiments, a system for resource transportation comprises a routing command subsystem configured to be communicably coupled to: an amount sensor at a production operation at a first location, the amount sensor configured to determine an amount of a resource at the production operation, the production operation using the resource at a use rate that varies over time, wherein the use rate further depends on availability of other resources at the first location; a location sensor associated with a transporter, the transporter configured to transport the resource, the location sensor configured to determine a transporter location. In some embodiments, the routing command subsystem is further configured to receive information about the use rate; and reroute the transporter based at least in part on the amount and the transporter location.

In some embodiments, the resource comprises sand. In some embodiments, the transporter comprises a rail car. In some embodiments, the transporter comprises a truck. In some embodiments, the amount sensor comprises at least one of a site sensor, a fracking van sensor, a sand mine sensor, or a transload sensor. In some embodiments, rerouting the transporter comprises routing the transporter via a transload.

In some embodiments, the routing command subsystem is further configured to reroute the transporter based in part on a quantity of the resource at the first location. In some embodiments, the routing command subsystem is further configured to reroute the transporter based in part on a total quantity of the resource consumed at the first location. In some embodiments, the routing command subsystem is further configured to reroute the transporter based in part on a predicted consumption rate at the first location. In some embodiments, the routing command subsystem is further configured to reroute the transporter based in part on a predicted consumption rate at a second site.

In some embodiments, a method for resource transportation comprises: determining an amount of a resource at a production operation at a first location, the resource being used at a use rate that varies over time, wherein the use rate further depends on availability of other resources at the first location; transporting the resource with a transporter; determining a transporter location; receiving information about the use rate; and rerouting the transporter based at least in part on the amount and the transporter location.

In some embodiments, the resource comprises sand. In some embodiments, the transporter comprises a rail car. In some embodiments, the transporter comprises a truck. In some embodiments, rerouting the transporter comprises routing the transporter via a transload. In some embodiments, the method further comprises rerouting the transporter based in part on a quantity of the resource at the first location. In some embodiments, the method further comprises rerouting the transporter based in part on a total quantity of the resource consumed at the first location. In some embodiments, the method further comprises rerouting the transporter based in part on a predicted consumption rate at the first location. In some embodiments, the method further comprises rerouting the transporter based in part on a predicted consumption rate at a second location.

In some embodiments, a method of automatic reconciliation comprises receiving logistics data from a logistics vendor; receiving payload data from a payload vendor; and automatically reconciling the logistics data with the payload data.

In some embodiments, the logistics data comprises a first date identifier; the payload data comprises a second date identifier; and performing the automatic reconciliation comprises matching the first date identifier with the second date identifier. In some embodiments, the first date identifier comprises at least one of a first arrival date or a first departure date and the second date identifier comprises at least one of a second arrival date or a second departure date. In some embodiments, the logistics data comprises a first purchase order number; the payload data comprises a second purchase order number; and performing the automatic reconciliation comprises matching the first purchase order number with the second purchase order number. In some embodiments, the logistics data comprises a first transporter identifier; the payload data comprises a second transporter identifier; and performing the automatic reconciliation comprises matching the first transporter identifier and the second transporter identifier.

In some embodiments, the method further comprises automatically generating pricing data based on a result of the automatically reconciling the logistics data with the payload data. In some embodiments, the payload data comprises a bill of lading number; and the automatic reconciliation comprises associating the bill of lading number with the logistics data. In some embodiments, the payload data comprises a payload weight; and the automatic reconciliation comprises associating the payload weight with the logistics data. In some embodiments, performing the automatic reconciliation comprises matching the logistics data and the payload data in a predetermined order. In some embodiments, performing the automatic reconciliation comprises matching the logistics data and the payload data using a fuzzy logic algorithm.

In some embodiments, a system for automatic reconciliation comprises a transceiver configured to: receive logistics data from a logistics vendor, and receive payload data from a payload vendor; and a processor configured to automatically reconcile the logistics data and the payload data.

In some embodiments, the logistics data comprises a first date identifier; the payload data comprises a second date identifier; and the processor is configured to automatically reconcile the logistics data and the payload data by matching the first date identifier with the second date identifier. In some embodiments, the first date identifier comprises at least one of a first arrival date or a first departure date and the second date identifier comprises at least one of a second arrival date or a second departure date. In some embodiments, the logistics data comprises a first purchase order number; the payload data comprises a second purchase order number; and the processor is configured to automatically reconcile the logistics data and the payload data by matching the first purchase order number with the second purchase order number.

In some embodiments, the logistics data comprises a first transporter identifier; the payload data comprises a second transporter identifier; and the processor is configured to automatically reconcile the logistics data and the payload data by matching the first transporter identifier and the second transporter identifier.

In some embodiments, the processor is further configured to automatically generate pricing data based on a result of the automatically reconciling the logistics data with the payload data. In some embodiments, the payload data comprises a bill of lading number; and the processor is configured to automatically reconcile the logistics data and the payload data by associating the bill of lading number with the logistics data. In some embodiments, the payload data comprises a payload weight; and the processor is configured to automatically reconcile the logistics data and the payload data by associating the payload weight with the logistics data.

In some embodiments, the processor is configured to automatically reconcile the logistics data and the payload data by matching the logistics data and the payload data in a predetermined order. In some embodiments, the processor is configured to automatically reconcile the logistics data and the payload data by matching the logistics data and the payload data using a fuzzy logic.

While multiple embodiments are disclosed, still other embodiments of the present disclosure will become apparent to those skilled in the art from the following detailed description, which shows and describes illustrative embodiments. Accordingly, the drawings and detailed description are to be regarded as illustrative in nature and not restrictive.

BRIEF DESCRIPTION OF THE DRAWINGS

FIG. 16 shows a screenshot from a logistics module indicating a mine estimated to be down for 56 hours according to an exemplary embodiment.

FIG. 19 shows a table demonstrating an example of how different failure points are detected, the failure points themselves, and examples optimizations according to an exemplary embodiment.

FIG. 23 shows a table of optimizations in response to detected points of failure according to an exemplary embodiment.

Figure 1:
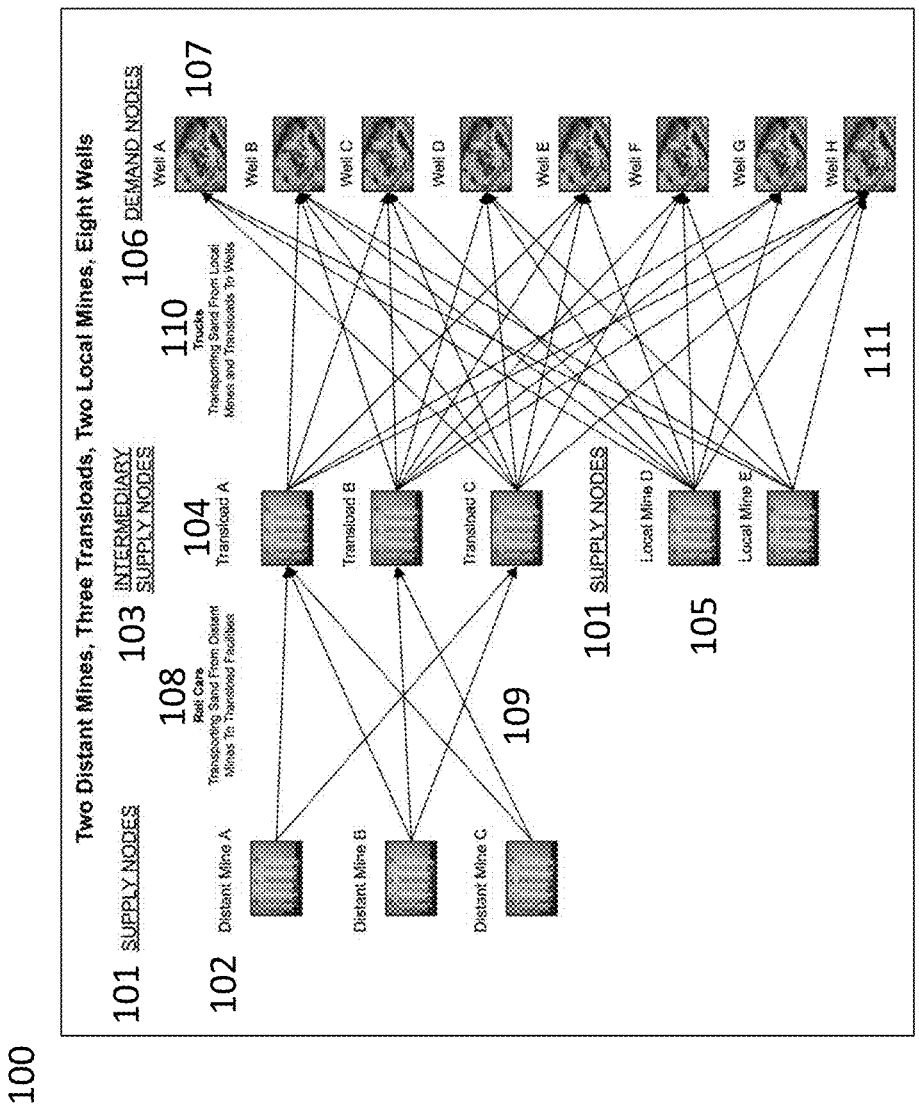
FIG. 1 illustrates a logistics system according to an exemplary embodiment.

While embodiments of the disclosure are amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

According to some exemplary embodiments, systems and methods disclosed herein may improve logistical operations.

According to some exemplary embodiments, logistics systems and methods such as resource transportation systems and methods may, for example, improve logistics operations by forecasting payload demand, forecasting supply availability, forecasting payload availability, forecasting transporter availability, among other factors. In some embodiments, supply availability may include payload availability and transport (e.g., transporter) availability. In some embodiments, additional factors may, for example, include trucker availability, driver availability, among others. Payloads may include different types of materials (e.g., sand, water, chemicals, other materials, drill pipes, equipment, personnel, etc.). Payloads such as sand may also have different types, e.g., different types of sand. In some cases, different transports may be used to transport different types of payloads. For example, different types of trucks/drivers may be used for different payloads (e.g., sand vs chemicals) and for different types of a particular payload (e.g., different types of sand). Storage equipment (e.g., silos) may also depend on the type of payload being stored. Transporters can, for example, have different characteristics such as operator type, equipment type, type of destination it can deliver to, and types of pick-up points, types of payload. Different types of trucks (e.g., pneumatic, flatbed, etc.) may be used depending on payload type. Equipment and truck selection may also depend on type of payload and transitions between payloads (e.g., cleaning may be desirable after transporting sand before transporting other payloads). Another factor which may be tracked (e.g., by measuring weight or using one or more other sensors), and which may affect efficiency is the quantity of payload carried by each transporter, for example, whether the transport capacity of a truck is fully utilized or whether trucks are only partially full. In some embodiments, these and other factors may be tracked in real-time and/or periodically and real-time and/or periodic optimizations may be performed in response to real-time inputs regarding these and other factors.

In some embodiments, systems and methods disclosed herein can optimize just-in-time delivery of material payloads via transporters from a tiered network of supply nodes, to one or more demand nodes in order to reduce or prevent shortages of delivered material at the demand nodes, to improve or maximize the efficiency of the transporters, and/or to reduce or minimize excess stock at any point in the network. This can, for example, create two-pronged value for users. First, it can reduce or prevent a shortage of delivered material at destination sites, which would cause production operations at the destination site to cease. This is also known as non-productive time and can have a hefty penalty for everyone involved in the operations. Second, it can reduce or minimize the time spent by transporters (e.g., at any point in the network) responsible for, e.g., carrying, loading, and delivering the payloads. In some embodiments, such systems and methods enable a) a reduction in demurrage/detention (waiting) charges and/or b) an increase in loads per day for the transporter, hence increasing their utilization rate. These and other advantages are described further herein.

In some embodiments, systems and methods disclosed herein can automatically reconcile various data (e.g., sensor data, customer data, financial data, billing data, shipment data, transporter data, etc.) associated with the payload delivery. In one example, payloads can be purchased or rented and delivered by the same vendor. In another example, payloads can be purchased or rented by one vendor (e.g., payload vendor) and delivered by a different vendor (e.g., logistics vendor). In some embodiments, this separation of the vendors between the purchase/rent and the delivery of the payloads can lead to two sets of data from the two separate vendors. An automatic reconciliation of these different sets of data, for example, can efficiently reconcile the data with each other and reduce the need for human manual approvals. This can, for example, create value for users and customers as it can reduce labor and provide more accurate billing information more quickly, which can also result in more rapid payment for services rendered. These and other advantages are described further herein.

FIG. 1 shows a logistics system such as a resource transportation system according to an exemplary embodiment. For illustrative purposes, an exemplary application of logistics system 100 is shown for sand logistics. Logistics system 100 may comprise one or more supply nodes 101. In this example, supply nodes 101 may comprise one or more distant mines 102 such as distant mines A, B, and C and/or one or more local mines 105 such as local mines D and E. Logistics system 100 may further comprise one or more intermediary supply nodes 103. The intermediary supply nodes 103 may, for example, include one or more transloads 104. For example, the logistics system 100 includes transloads A, B, and C in this example. Logistics system 100 may also include one or more demand nodes 106. The demand nodes 106 may include wells 107, such as wells A-H.

In some embodiments, transports such as rail cars 108 may be used for transporting a payload such as sand between supply nodes 101 (e.g., distant mines 102) and intermediary supply nodes 103 (e.g., transloads 104) via pathways 109. Transports such as trucks 110 may be used for transporting a payload such as sand between intermediary supply nodes 103 (E.g., transloads 104) and demand nodes 106 (e.g., wells 107). Transports such as trucks 110 also may be used for transporting a payload such as sand between supply nodes (e.g., local mines 105) and demand nodes 106 (e.g., wells 107).

Continuing with the example of sand logistics, in some embodiments, the logistics system 100 optimizes for just-in-time delivery of sand during the process of fracturing/stimulating a well. The process of fracturing/stimulating a well may entail pumping a combination of sand, water and chemicals into the ground to fracture the reservoir and liberate oil and gas to flow to the surface. In this example, the logistics system 100 can deliver the material or payload (e.g., sand) just-in-time via transporters such as rails 108 and trucks from a tiered network of supply nodes 101 (e.g., mines 102 and local mines 105) and intermediary supply nodes (e.g., transloads), to eventually one or more demand nodes (e.g. wells 107). In some embodiments, the logistics system reduces or prevents shortages of sand at the wells 107, increases or maximizes the efficiency (e.g., loads per day) of the rails 108 and trucks 109, and reduces or minimizes excess sand stock at the well 107 at any point in the network.

In some embodiments, sand and/or other materials may, for example, comprise the payload. A mine may, for example, be a source pick-up point for materials. A well may, for example, be a drop-off point for sand. Hydraulic fracturing ("frac") operations may, for example, be an activity that consumes sand at the destination (well) site. A transload may, for example, be a facility where transport such as rail cars drop off sand, and then transports such as trucks pick up that sand to deliver to the well. A transload may be a source of sand, similar to a mine, however it is an intermediary source because the sand at the transload comes from another mine, e.g., through rail. A node may be a primary sand source (e.g., mines), an intermediary sand source (e.g., transloads), as well as a destination site (e.g., well).

In some embodiments, systems and methods disclosed herein may include one or more users. In some embodiments, the users may include one or more customers who use the systems and methods disclosed herein. In some embodiments, the users may include one or more vendors (e.g., logistics vendors and/or payload vendors) who use the systems and methods disclosed herein. In some embodiments, the users may include one or more operators (e.g., drivers) of a transporter. In some embodiments, the users may include one or more supervisors who coordinate some or all source and destination activity. In some embodiments, the users may include one or more dispatchers who dispatch transporters to satisfy a supervisor's needs related, e.g., to pick-up times, drop-off times, quantities and routes taken by transporters. In some embodiments, the users may include one or more coordinators who are in the field who enter observable information into the system. In some embodiments, the users may include one or more of each of the forgoing examples of users.

Continuing with the sand logistics example of FIG. 1, in some embodiments, the logistics system 100 may operate with one or more users. In some embodiments, the users may include one or more logistics supervisors. Logistics supervisors who head operations and are responsible and accountable for the timely delivery of sand may be referred to as last mile owners (LMOs). LMOs may be at or near the top of a logistics operations hierarchy. LMOs may work for the company that is fracking the well, which may be an oilfield services (OFS) company. In some embodiments, the users may include one or more transport operators. Transport operators of a transporter may, for example, include truckers, rail operators, and/or other drivers and operators. Such transport operators may, for example, work for the trucking company or be independent contractors. In some embodiments, the users may include one or more transport dispatchers. Transport dispatchers who dispatch the operators of the transport (e.g., rail or truck) to satisfy the LMOs needs related to picking up and dropping of sand, pick-up times, drop-off times, quantities and routes taken by driver may be referred to as trucking dispatchers and rail dispatcher. Trucking dispatchers and rail dispatchers may, for example, work for the trucking or rail company. In some embodiments, the users may include one or more sand coordinators. Sand coordinators who are onsite at the source of sand may be referred to as sand mine or transload coordinators. Sand coordinators may, for example, work for a company supplying the sand (e.g., the mine). In some embodiments, the users may include one or more well coordinators. Well coordinators who are onsite at the destination (e.g., a well) may, for example, be referred to as onsite sand coordinators, onsite well coordinators, frac engineers, or company men or women, or sand pushers. Such well coordinators may work for the company that is fracking the well, which may be an oilfield services (OFS) company.

Although this and other examples illustrated herein discuss sand logistics for illustrative purposes, it will be appreciated that the payload could be any other resource or combination of resources, such as chemicals, water, raw materials, finished goods, parcels, or anything else that is transportable, such as equipment and personnel, and other materials. Likewise, the nodes need not be mines, transloads, and wells. The types of nodes will depend on the applications. For example, in the case of finished goods, the source nodes may, for example, include factories, the intermediary nodes may, for example, include distribution centers, and the demand nodes may, for example, include retail stores. As another illustrative example, in the context of chemical distribution, the source nodes may, for example, include chemical manufacturing plants, the intermediary nodes may, for example, include temporary chemical storage facilities, and the demand nodes may, for example, include chemical customers, such as mines, factories, and others. Similarly, transporters are not limited to rail cars and trucks. In some embodiments, transporters may include other forms of transport, such as planes and boats, for example.

Figure 2:
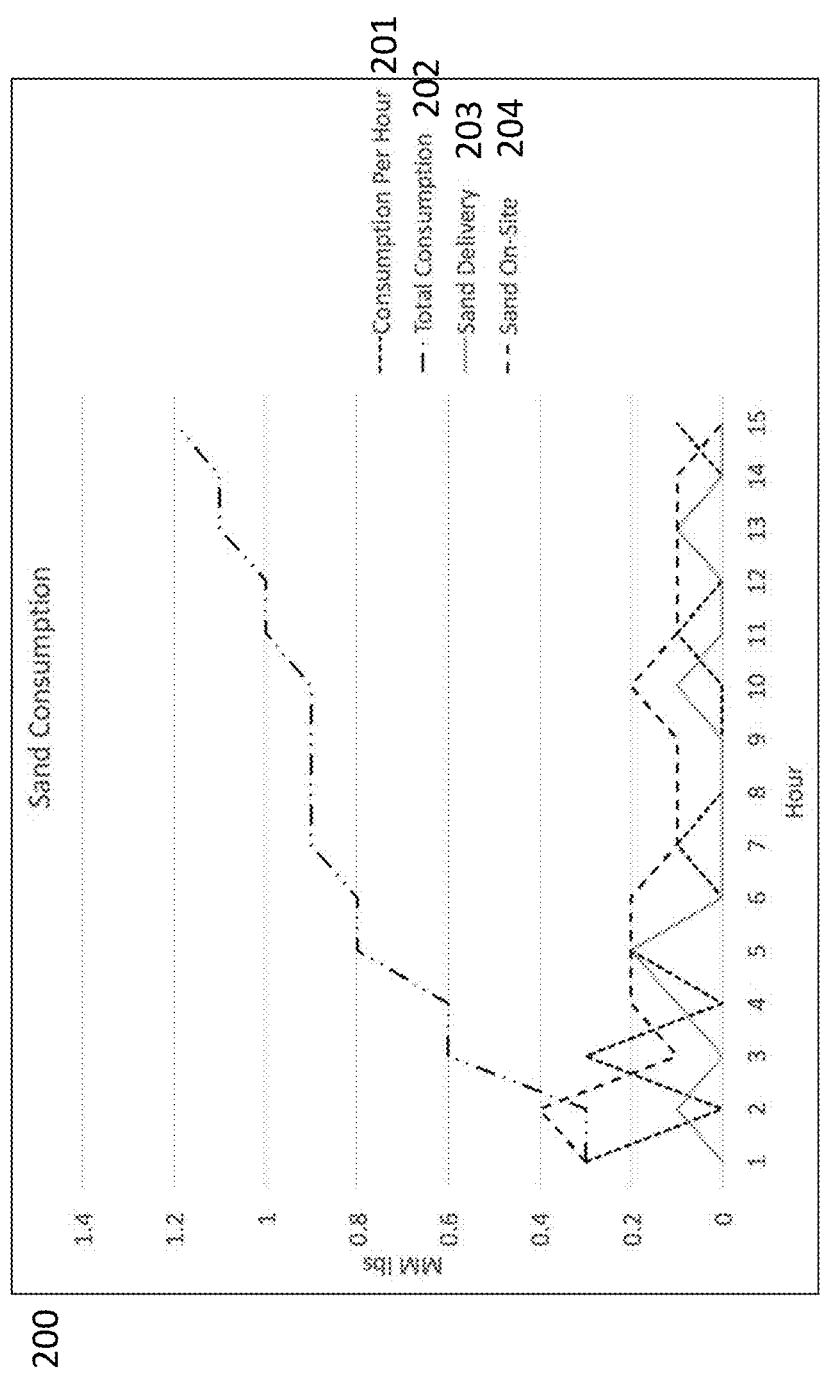
FIG. 2 shows a graph that illustrates the impact of shifting sand demand and supply on on-site storage at a well according to an exemplary embodiment.

FIG. 2 shows a graph 200 that illustrates the impact of shifting sand demand and supply on on-site storage at a well according to an exemplary embodiment. Line 201 shows sand consumption per hour. Line 202 shows total sand consumption. Line 203 shows the rate of sand delivery. Line 204 shows the quantity of sand on-site.

A logistics system according to some embodiments may synthesize information (e.g., information shown in the graph 200 with lines 201-204) to improve or optimize schedules based on real-time and/or predictive factors. For example, as shown in FIG. 2, the sand consumption rate 201 varies over time and periodically drops to zero. In the context of fracking, the sand consumption rate 201 may at times drop to zero as part of the fracking process. For example, fracking may involve repeated steps alternating between drilling holes and pumping sand. The sand consumption rate 201 may periodically drop to zero during drilling and then resume during pumping phases. For example, the sand consumption rate 201 drops to zero at time three and then rises again from times 3 to 5. The sand consumption rate may also drop to zero for longer periods of time, for example, due to equipment malfunctions, as shown, for example between times 6 and 9. Such dips in sand consumption may have been unplanned and may result in non-productive time, e.g., while machinery is being repaired.

Another factor is the sand stored on-site, shown with line 204. If line 204 rises too high, it may reach the maximum storage capacity at a particular site. In this case, transports (e.g., trucks) that wish to deliver sand may be unable to do so until additional sand storage becomes available (e.g., by consuming some of the stored sand). This can result in transports (e.g., trucks) being unproductive while they wait for storage to become available so that they can deliver the sand. On the other hand, if the on-site storage drops to zero, there may not be sufficient sand available to achieve the desired consumption rate. This too can result in non-productive time while fracking operations await delivery of additional sand. Therefore, it may be desirable to keep on-site sand 204 below the maximum, while still having sufficient sand to avoid sand shortages.

For example, consumption rate may, for example, be 100,000 pounds per hour. In this example, it may be desirable to have a delivery rate 105,000 pounds per hour to match demand while maintaining a safety factor of 5000 pounds per hours. The safety factor at location may depend on expected future demand for sand. In some embodiments, the safety factor may range from 0% to 50%. In some embodiments, the safety factor may range from 5-50%. In some embodiments, the safety factor may range from 5-10%. In some embodiments, the safety factor may be about 5%. In some embodiments, one or more safety factors may be based on factors such as predicted supply and/or predicted demand.

As a further illustrative example, sand could be optimized by one or more factors such as onsite storage. For example, maximum storage could for example be 3 million pounds at a particular well (though the amount of onsite storage could be more or less than this amount in other examples). Sand storage at the well could be maintained at a target level (e.g., 75%, 50%, 25%, 10%, 5% of maximum onsite storage). In some embodiments, onsite storage targets may be dynamically adjusted. For example, a site storing 100 hours of sand on site a predicted consumption rates, could bring it down to 5 hours, and then to 1 hour as the mine operator prepares to shut down the mine.

In some embodiments, the logistics system may improve or optimize the onsite storage of sand through real-time monitoring and/or predictive forecasting of the supply and consumption rate for sand at various wells. The logistics system may improve or optimize the delivery of sand by adjusting the sand delivery rate 203 to maintain a desired level of onsite sand 204 based, for example, on real-time and/or predicted sand consumption 201. In some embodiments, the logistics system can perform one or more of monitoring real-time information of the present and predicting/optimizing information for the future.

The logistics system may also improve or optimize sand logistics near the end of operation for a well. When a well is approaching its end of operation, it may be desirable to use up the remaining on-site sand, while avoiding sand shortages. To help achieve this objective, the sand logistics system can optimize factors like the sand consumption rate 201, the total consumption 202, the sand delivery rate 203, and the sand on-site 204 to determine the remaining sand that is expected to be used during the operation of the well and how much additional sand should be supplied and at what rate to provide sufficient sand to complete fracking operations at the well, without running out of sand and while reducing or minimizing unused sand that remains at the well after fracking operations are completed.

In some embodiments, by integrating data regarding transporter availability, payload availability, and demand, the logistics system can generate both a simulation of the current scenario and suggested scenarios including an optimized schedule for some or all wells indicating improved or optimal transporters, payloads and supply nodes to be selected, as explained further herein. Scenarios may include one or more optimizations of factors such as sand supply, sand demand, and transporters. For example, a scenario might include increasing sand supply at particular mines, adding additional mines, adding additional trucks, and rerouting trucks. In some embodiments, the systems may provide aggregate statistics for each scenario which serve to indicate the quality of the scenario. For a current scenario, this can indicate potential issues with the logistics environment (e.g., aggregate non-productive time (NPT) resulting from sand shortages, aggregate demurrage times). For an optimized scenario, this can indicate cost savings or loads per day efficiency improvements above the current scenario.

Figure 3:
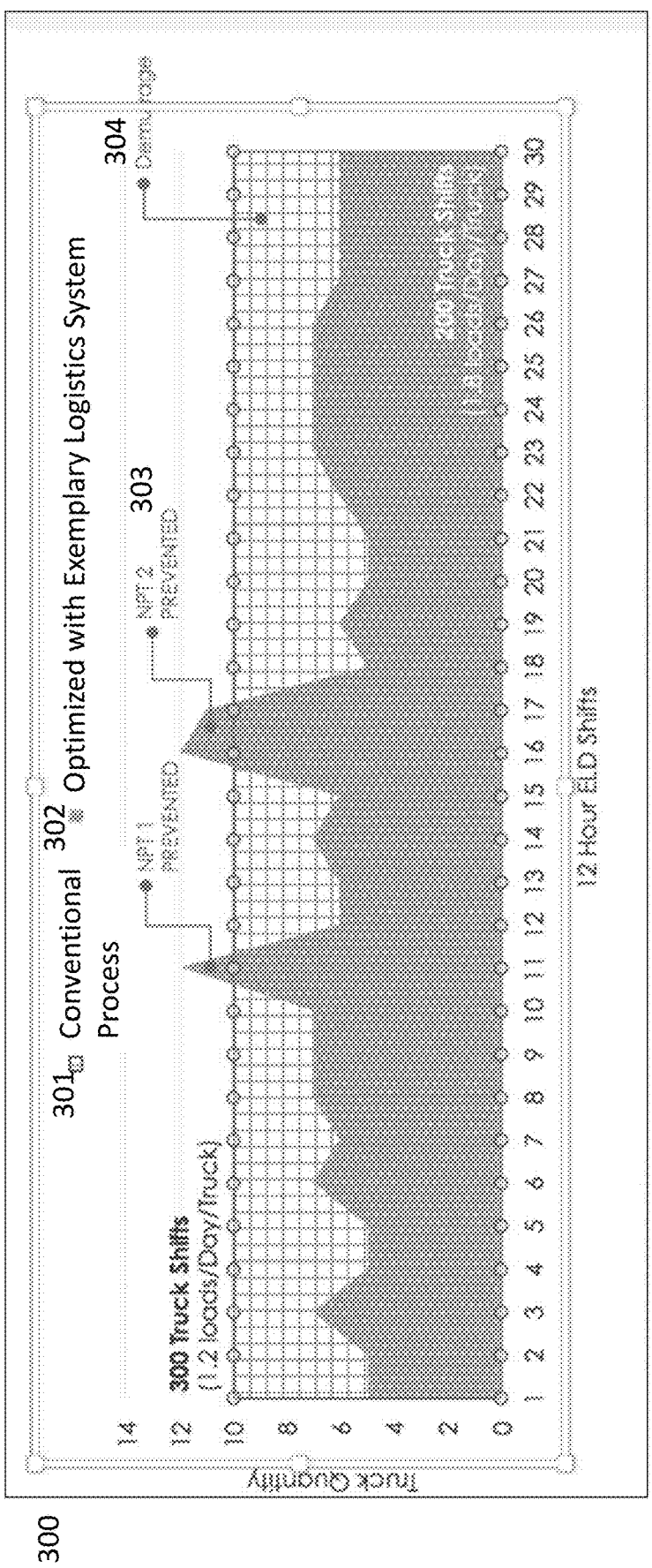
FIG. 3 shows an example of value created for various stakeholders by a logistics system according to an exemplary embodiment.

FIG. 3 shows an example of value created for various stakeholders by the logistics system according to an exemplary embodiment. Graph 300 shows a graph of plot of truck quantity per shift. Line 301 illustrates a conventional delivery process that uses a dedicated fixed number (e.g., 10) of trucks, picks up sand from pre-defined, fixed mines, and rotates fixed quantities of trucks every Electronic Logging Device (ELD) shift. For example, line 301 illustrates an example of a conventional process with 10 trucks per shift over 30 shifts for a total of 300 truck shifts, which amounts to 1.2 loads per day per truck.

In some embodiments disclosed herein, the logistics system may perform intelligent scheduling. Intelligent scheduling may include intelligently assigning the least amount of trucks by staggering truck schedules and leveraging mines with the least wait and transit time. In some embodiments, the logistics system may monitor last mile real time health, which may comprise monitoring multi-mine/well/truck network health (e.g., live operations status and wait times). In some embodiments, the logistics system may monitor last mile real time optimization, which may comprise providing real time actionable insight to improve health by changing mines (e.g., pick-up locations), truck quantity, and wells (e.g., drop-off locations).

Line 302 shows a delivery process optimized according to an exemplary embodiment of the logistics system. By matching payload (e.g., sand) supply to demand by varying the number of trucks used per shift, the total number of truck shifts is reduced to 200 in this example and the efficiency is improved to 1.8 loads/day/truck. The logistics system according to an exemplary embodiment can also reduce non-productive time by reducing or avoiding payload (e.g., sand) shortages. For example, at points 303 where non-productive time is prevented, the logistics system optimizes the number of trucks based on the increase in demand, as shown with line 302, whereas the conventional process continues to supply a constant and temporarily insufficient number of trucks. The conventional process 301 also results in demurrage 304, in which excess trucks are not utilized due to insufficient demand.

Continuing with the exemplary application to sand logistics, the logistics system according to an exemplary embodiment can create value for the trucking vendor, the end-user of the sand, and the suppliers of sand. These values may, for example, include the following.

Improved Asset Utilization—For example, reducing the time a truck is waiting to load and unload results in a lower total cost for transportation for the end user of the sand and allows the trucking vendor to perform more loads during a given day.

Reduction or Prevention of Sand Drought—For example, by forecasting the demand and availability of sand, the end user is better able to predict and react to any issues with supply which prevent the well from running out of sand and stopping work.

Improved Visibility in Spot Market for Transporter and Sand Provider—By generating improved or optimized schedules for both sand and transporters and improving visibility into demand, both the trucking vendor and the sand vendor are able to more efficiently allocate their supply of sand and trucks and determine how many resources they have available at any given time for offer on the spot market.

Continuing with the illustrative example shown in FIG. 3, the value to the last mile owner includes two to zero instances of NPT on a two well pad for sand avoiding NPT of 36 hrs, lower demurrage on a two well pad for a wait time drop of 3.4 hours, and lower average truck need per day for a two well pad resulting in a truck demand reduction of 34% and a loads/day increase of 50% in this example. The value to the trucking company in this example includes a higher revenue/utilization rate increase of 32% and a loads/day increase of 50%, as well as lower driver turnover with an onboarding cost reduction of 50%. The value to the send company in this example includes higher revenue/utilization rate, resulting in NPT savings and increased revenue from real-time spot market calculations, for example, increasing revenue by 20%.

Figure 4:
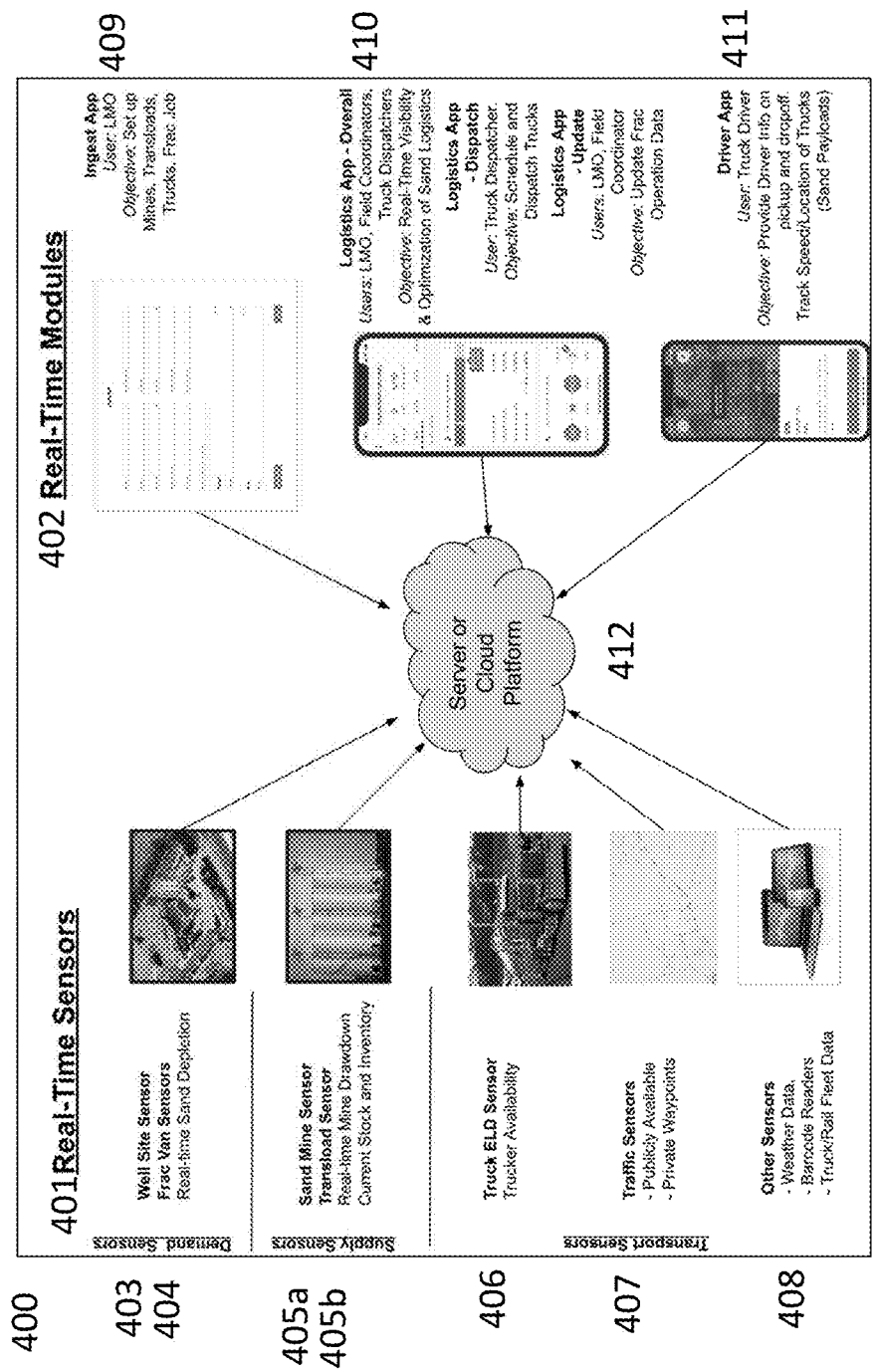
FIG. 4 illustrates a logistics system according to an exemplary embodiment.

FIG. 4 illustrates a logistics system 400 according to an exemplary embodiment. The logistics system 400 may include one or more real-time sensors 401 and/or one or more real-time modules 402. For example, continuing with the illustrative example of sand logistics, the real-time sensors 401 may comprise one or more well site sensors 403, fracking van sensors 404, sand mine sensors 405a, transload sensor 405b, truck ELD sensors 406, traffic sensors 407, and/or others sensors 408. The real-time modules 402 may comprise one or more ingest apps 409, logistics apps 410 (including, e.g., overall logistics modules, dispatch logistics modules, and update logistics modules), and/or driver apps 411. The logistics system 400 may also include one or more services or cloud platforms 412. The sensors 401 and modules 402 may interact with one or more physical servers and/or cloud-based servers 411 to upload their inputs so that the system can process them. Such upload may occur automatically in real time, may occur according to a predetermined frequency or schedule, may be triggered by some criteria (e.g. a percent change in the value observed), and/or may be pushed or pulled from sensor to server.

The logistics system 400 may use the real-time sensors 401 and/or real-time modules 402 to match supply with dynamically changing demand, for example, by providing inputs to setup the operations as well as in real time during operations. The inputs may come from sources including, for example, sensors that provide information about states of nodes in the network (e.g., real-time sensors 401) and users using computer-based modules which provide similar information (e.g., real-time modules 402).

In some embodiments, the logistics system 400 may comprise one or more sand demand sensors such as well site sensors 403 and fracking van sensors 404. The sand demand sensors may indicate sand depletion, levels of present and future sand at well sites (e.g. coming from fracking (frac) vans or silos). For example, sand level sensors 403 for storage at a well may include one or more of the following sensors: non-contact radar which performs continuous measurement, acoustics-based "3D" sensors, mechanical "bob" sensors which lower to meet level of sand as it is consumed, guided wave radar sensors, and/or laser level sensors. Additionally, for example, Frac Van sensors 404 include one or more of the following sensors: a computer system which contains the schedule of frac operations, highly accurate transducers which are placed along surface lines and in downhole locations which monitor real-time pressure, flowmeters placed along surface lines which measure consumption rates of sand, densometers which measure the density of the fluid being pumped downhole.

In some embodiments, the logistics system 400 may comprise one or more site operation status sensors such as site sensors 403, fracking van sensors 404, sand mine sensors 405a, and/or transload sensors 405b. The site operation status sensors may indicate operational status of wells, mines and transloads.

In some embodiments, the logistics system 400 may comprise one or more supply sensors such as sand mine sensors 405a and transload sensors 405b. The sand supply sensors may indicate present and future inventory sand at mines and transloads (e.g., coming from silos and other sand storage devices). For example, sand mine sensors 405a and transload sensors 405b may include one or more of the following sensors non-contact radar which performs continuous measurement, acoustics-based "3D" sensors, mechanical "bob" sensors which lower to meet level of sand as it is consumed, guided wave radar sensors, and/or laser level sensors.

In some embodiments, the logistics system 400 may utilize sand transportation supply data. The logistics system 400 may obtain sand transportation supply data from one or more transport availability sensors (e.g., truck ELD sensors 406), transportation availability data from other logistics systems, and/or sensors that indicate operation status of trucks and rails. The transport availability sensors may indicate availability of truckers (e.g., using electronic logging devices (ELD) in trucks). The transportation availability may, for example, be obtained via interfaces to logistics systems used by trucking companies or rail companies. For example, truck ELD sensors 406 may be certified by regulatory entities and may provide one or more of the following: connections to a truck's engine to record if a truck is in motion; driver status such as on-duty, off duty; and/or data in standardized format that be transmitted, e.g., via internet or cellular technology.

In some embodiments, the logistics system 400 may utilize sand movement data. The logistics system 400 may obtain sand movement data from one or more traffic sensors 407 and/or other sensors 408. For example, the logistics system 400 may obtain sand movement data from one or more interfaces with systems that publish near real-time traffic data (e.g. Google Maps) for understanding status of payload movement in trucks, from systems that generate waypoint data to discover ETA, traffic congestion and wait times at mines and transloads (e.g., using a driver app), from barcodes read by scanners at multiple points along the network of mines and wells, and/or from interfaces to systems that provide weather data which can be used to determine impacts of weather on transportation. Traffic sensors 407 may for example be mounted in the proximity of roadways which produce data that is transmitted (e.g., via internet or cellular technology) and may include one or more of the following: radar, active infrared, lasers, and/or drones. Traffic sensors 407 may also be comprised of waypoint data which comes from a driver app (e.g., driver app 612 shown in FIG. 6). These waypoints may be generated by the mobile device GPS system which is accessed via an app. Other sensors 408 may for example include one or more of the following: data from weather Sensors such as rain gauges or wind gauges which detect adverse weather situations and transmit that data via internet or cellular technology; and/or data from fleet systems that rail and truck companies use to manage their assets, which may utilize ELD and mobile apps to determine trucker location, availability, speed, equipment, and other information.

In some embodiments, the logistics system 400 may include one or more real-time modules 402. The real-time modules 402 may be, for example, mobile and/or web apps (applications) that allow users to input data. The real-time modules 402 may include one or more ingest apps 409 (also referred to as job set up apps). For example, an ingest app 409 module may be used by last mile owners (LMOs) to enter data about the specifics of frac operations, including, for example, sand pick up sources (e.g., mines and transloads), mine and transload quotas and contracts, sand drop off destinations (e.g., wells), rates of types of sand (e.g., mesh) consumption during the frac operations (e.g., frac design), number of rails and trucks, and other specifics of the frac job. Data from ingest app 409 may be used to set up boundary conditions for logistics system software for a specific frac operation.

In some embodiments, the real-time modules 402 may include one or more logistics apps 410 (including, e.g., overall logistics modules, dispatch logistics modules, and update logistics modules). Logistics apps 410 may include logistics health, diagnostics, and optimization modules, which may, for example, be used by LMO, trucking dispatch, sand mine/transload coordinators, on-site mine/transload/well coordinators to manage and observe changes to all logistics involving delivery of sand from mines and transloads to wells. Logistics apps 410 may be used to see failure points in the network, see predicted consequences of the failure points, generate automated optimization schedules and recommendations, and act upon optimizations to reduce or eliminate NPT or demurrage.

In some embodiments, logistics apps 410 may perform rail and truck dispatching. This feature may be used by truck dispatchers and rail dispatchers to schedule and assign trucks and rails to satisfy a schedule that is desired by an LMO. Logistics apps 410 may also provide a network status. This feature may be used by coordinators to crowd source information about progress of frac operations at a destination site. This may include, for example, levels of sand in well site storage, consumption rates of sand, arrival and/or departure of trucks and/or rail transports, status of wells, mines and transloads, and/or the like.

In some embodiments, the real-time modules 402 may include one or more driver apps 411. The driver apps may be used by drivers of trucks and rails. Driver app modules may communicate location information about a transporter and may also be used to communicate with a driver regarding a job they are to perform.

In some embodiments, the logistics system 400 may use data analytics based on historic data. For example, the historical data may include difficulty or likelihood of well issues (e.g., those impacting the schedule or rate of sand consumption, such as from well equipment failure). Historical data may, for example, be based on factors such as frac crew experience, geological formation depth and criteria, and/or historical performance of equipment in this geological formation. Real-time data obtained from one or more real-time sensors and/or real-time modules may be stored for later use as historical data. Historical data may also, for example, be obtained from third party systems and other data sources. In some embodiments, the logistics system may utilize a combination of real-time data and historical data. In some embodiments, one or more aspects of the logistics system 400 (and other logistics systems described herein) may be implemented with one or more computing devices such as mobile devices, laptops, desktops, cloud computing resources, servers, terminals, virtualization tools, communication devices. In some embodiments, one or more components of logistics system 400 may include one or more transmitters, receivers, and/or transceivers to communicate using one or more techniques such as wired communication and/or wireless communication. In some embodiments, one or more such computing devices of the logistics system may comprise software such as one or more applications or apps. In some embodiments, a logistics system may include one or more hardware and/or software components. In some embodiments, one or more components of a logistics system may include one or more memories storing instructions and one or more processors configured to execute the instructions to perform one or more operations described herein. In some embodiments, one or more software components of a logistics system may be embodied on a non-transitory computer readable medium.

In some embodiments, a resource transportation system (e.g., a logistics system) may comprise a production operation at a first location such as a well 107 (e.g., well A) in FIG. 1. The production operation may use a resource (e.g., sand and/or other materials) at a use rate that varies over time (e.g., as shown with consumption per hour 201 in FIG. 2). The use rate may further depend on availability of other resources at a first location such as a well 107. An amount sensor such as real-time sensors 401 in FIG. 4 at the production operation can be configured to determine an amount of the resource at the production operation such as sand on site 204 in FIG. 2. There may also be another a source repository of the resource at a second location such as another well 107 (e.g., well B) remote from the first location. A transporter such as a railcar 108 or a truck 110 can be configured to transport the resource. A location sensor (e.g., a real-time sensor 401) associated with the transporter can be configured to determine a transporter location. The resource transportation system may additionally include a control system communicably coupled to the location sensor and the amount sensor. The control system may be further configured to receive information about the use rate and to reroute the transporter to one of the first location and the second location based on factors such as the amount, the use rate, and the transporter location.

In some embodiments, a system for resource transportation (e.g., a logistics system) may comprise a routing command subsystem configured to be communicably coupled to an amount sensor (e.g., real-time sensor 401 in FIG. 4) at a production operation at a first location (e.g., a well 7 in FIG. 1). The amount sensor may be configured to determine an amount of a resource (e.g. sand or other materials) at the production operation. The production operation may use the resources at a use rate that varies over time (e.g., as illustrated with consumption per hour 201 in FIG. 2). The use rate may further depend on availability of other resources at the first location. The system for resource transportation may also include a location sensor (e.g., real-time sensors 401 in FIG. 4) associated with a transporter (e.g., a truck or rail). The transporter may be configured to transport the resource and the location sensor may be configured to determine a transporter location. The routing command subsystem may be further configured to receive information about the use rate and reroute the transporter based on the amount and the transporter location.

Figure 5:
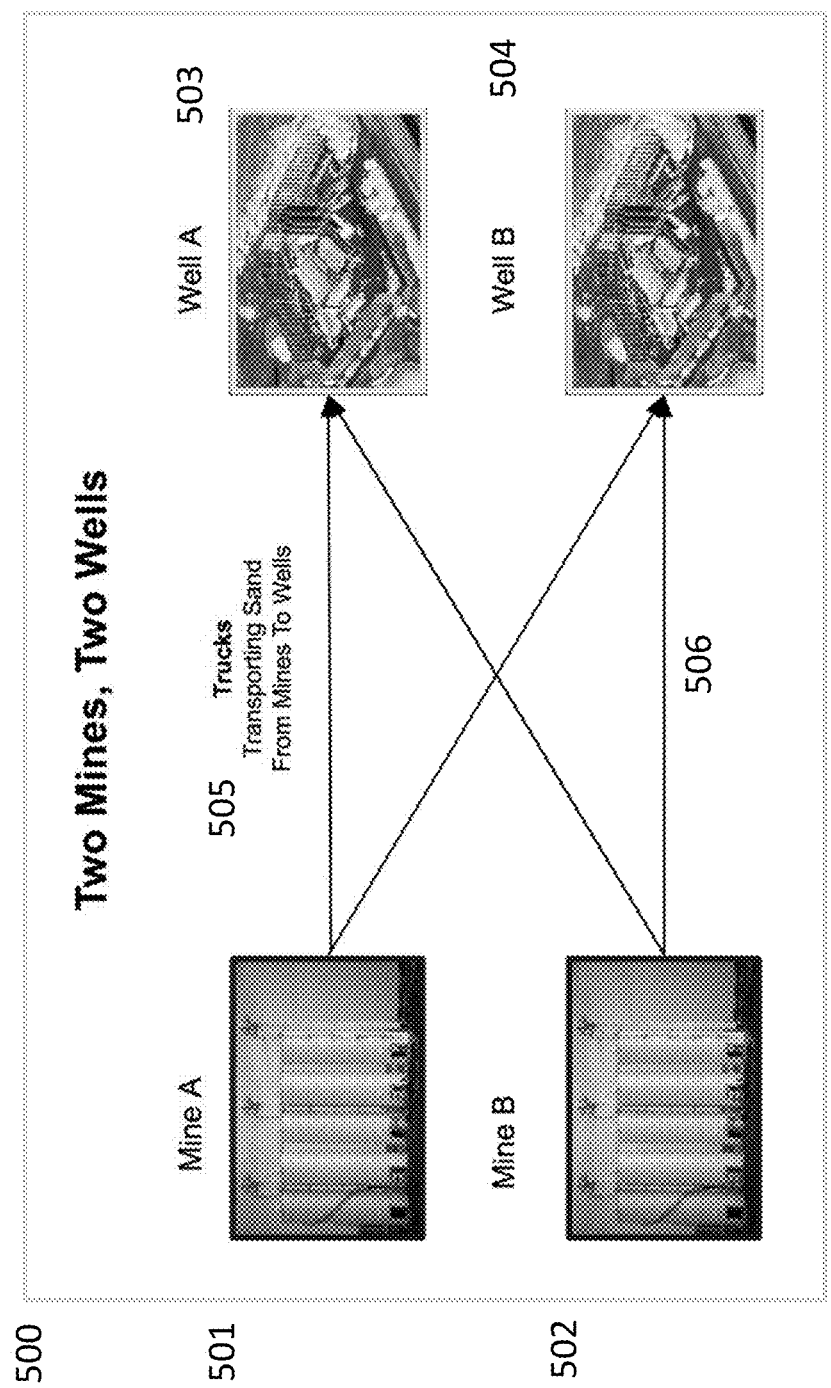
FIG. 5 illustrates an exemplary application of a logistics system to an illustrative example with two wells and two mines according to an exemplary embodiment.

FIG. 5 illustrates a logistics system 500 according to an exemplary embodiment involving an illustrative example with two wells and two mines. The logistics system 500 may include mine A 501, mine B 502, well A 503, well B 504, one or more trucks 505, and pathways 506 between the mines and the wells. In this illustrative example, two frac operations are being provided with sand from two separate mines. As discussed further below, this example is used to illustrate an example of inputs both from sensors and modules and how logistics system 500 leverages one or more algorithms and other techniques to improve or optimize logistics operations, according to embodiments. In some embodiments, inputs (e.g., sensors and modules) provide data. The logistics system may include a process (e.g., which runs on a server) that uses data from the sensors and modules to match supply with demand at all well sites taking into account numerous constantly changing real time factors within the network. It will be appreciated that the use of two mines and two wells has been selected for illustrative purposes and that in other embodiments and applications, the number of mines and wells may be greater or less than two.

Figure 6:
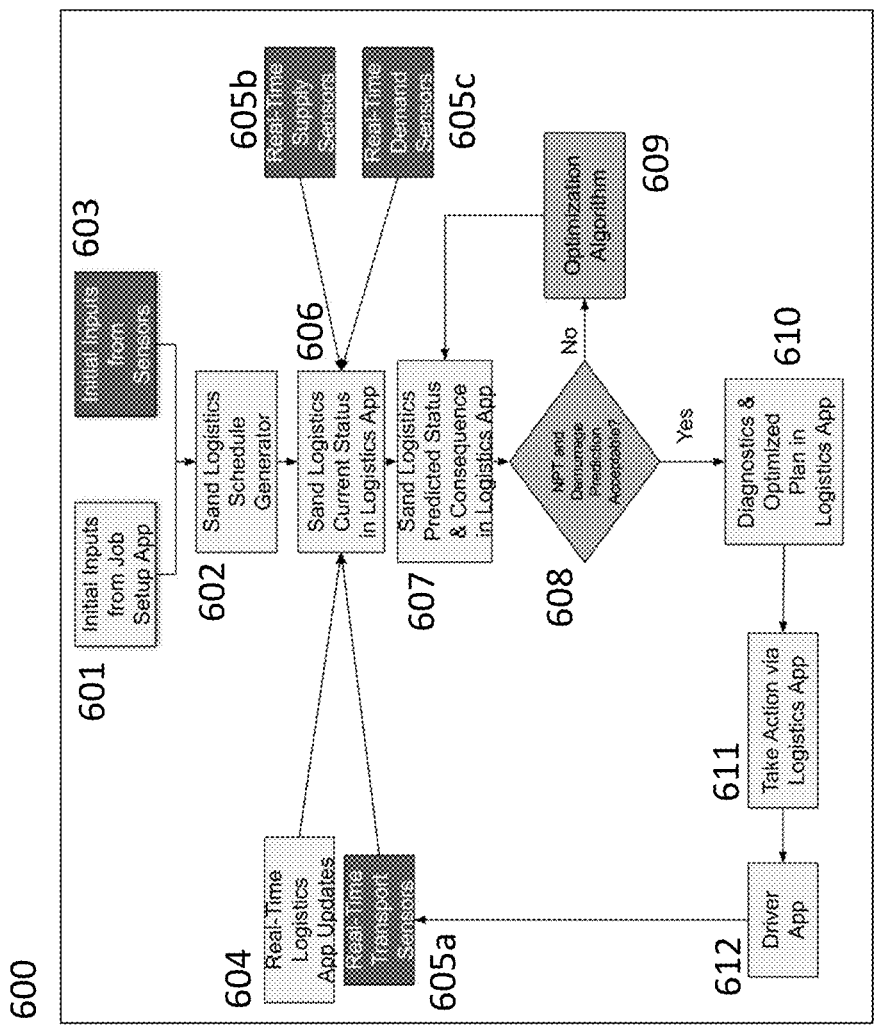
FIG. 6 illustrates a logistics method according to an exemplary embodiment.
Figure 7:
FIG. 7 shows a screen from a job setup application according to an exemplary embodiment.

FIG. 6 illustrates a logistics method 600 according to an exemplary embodiment. The logistics method 600 will be described for illustrative purposes with an exemplary application to using two mines and two wells, as shown in FIG. 5. At step 601, the job setup is performed. Job setup may include the last mile owner (LMO) being made aware of a schedule of impending frac operations at two wells. The LMO may use a job setup app to enter information about destination wells and frac operations that will take place there. The sand logistics job may be setup based on pick up and pick up sources (e.g., mines and transloads), drop off destinations (e.g., wells), rates of payload (e.g., sand) consumption during the frac operations (e.g., frac design), number of rails and trucks, and other specifics of the frac job. FIG. 7 shows a screen from the job setup application according to an exemplary embodiment.

Figure 8:
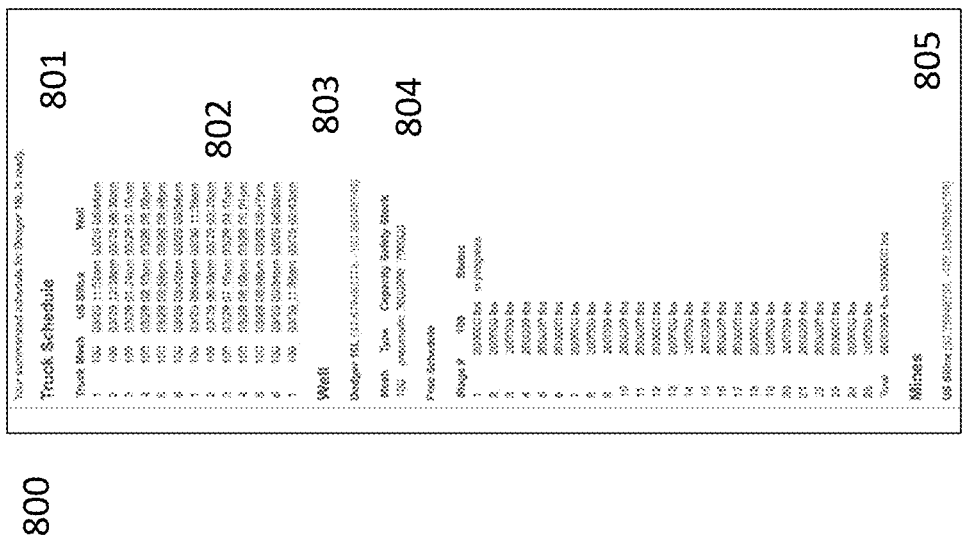
FIG. 8 shows an example of an optimized schedule for one mine and one well according to an exemplary embodiment.

Returning to FIG. 6, at step 602, the logistics system performs a schedule generation step. The schedule generation step may comprise receiving initial inputs from a job setup app received in step 601 and initial inputs from sensors 603 and using an algorithm to create a schedule to support frac operations with pickup times at mines and drop-off times at wells. Along with the schedule, the algorithm may determine and output non-productive time (NPT) and demurrage calculations. The schedule may be comprised of specifics about the source and destination locations, the schedule of transporters including pickup and drop-off times, and information about the different stages of production operations. If those calculations are within acceptable ranges, then the schedule may be sent (e.g., via email) to a last mile owner. FIG. 8 shows an example of an optimized schedule for one mine and one well according to an exemplary embodiment.

In some embodiments, the algorithm 602 may improve or optimize the schedule based on factors such as NPT, demurrage, and/or utilizing fewer trucks/rails. In some embodiments, the inputs to algorithm 602 may include one or more of the following at one or more wells: Number of stages at well; Latitude/Longitude of well; Prefill Date; Frac Date; Total number of trucks available; Unload Time; Truck Type; Truck Load; 24-hour demurrage threshold; Storage capacity by mesh type; and/or Mines available to supply this well. In some embodiments, the outputs of algorithm 602 may include one or more of the following: a schedule for trucks (e.g., shown in FIG. 8), a schedule for sand needed by stage (e.g., shown in FIG. 8), optimized pickup and drop-off locations, and/or schedule of rails. In some embodiments, the algorithm may optimize factors such as NPT, demurrage, and/or trucks/rails utilization based on one or more of the following: Number of trucks/rails, Pickup locations, and/or drop-off locations. In some embodiments, the algorithm 602 takes the inputs and creates a schedule of trucks and rails that result in the lowest numbers for NPT, Demurrage and Truck utilization. In some embodiments, the algorithm 602 does not assign trucks to jobs and therefore is not aware of constraints that may appear due to trucks being assigned by dispatch. In some embodiments, these considerations may be addressed at steps 607 and 609. Dispatchers may take the output schedule from this algorithm and assign trucks using a dispatch tool. In some embodiments, algorithm 602 may use one or more computing techniques such as extrapolation techniques, interpolation techniques, artificial intelligence methods, machine learning, data set comparisons, reinforcement, supervised learning, unsupervised learning, neural networks, Bayesian networks, and R2 convergence techniques.

Figure 9:
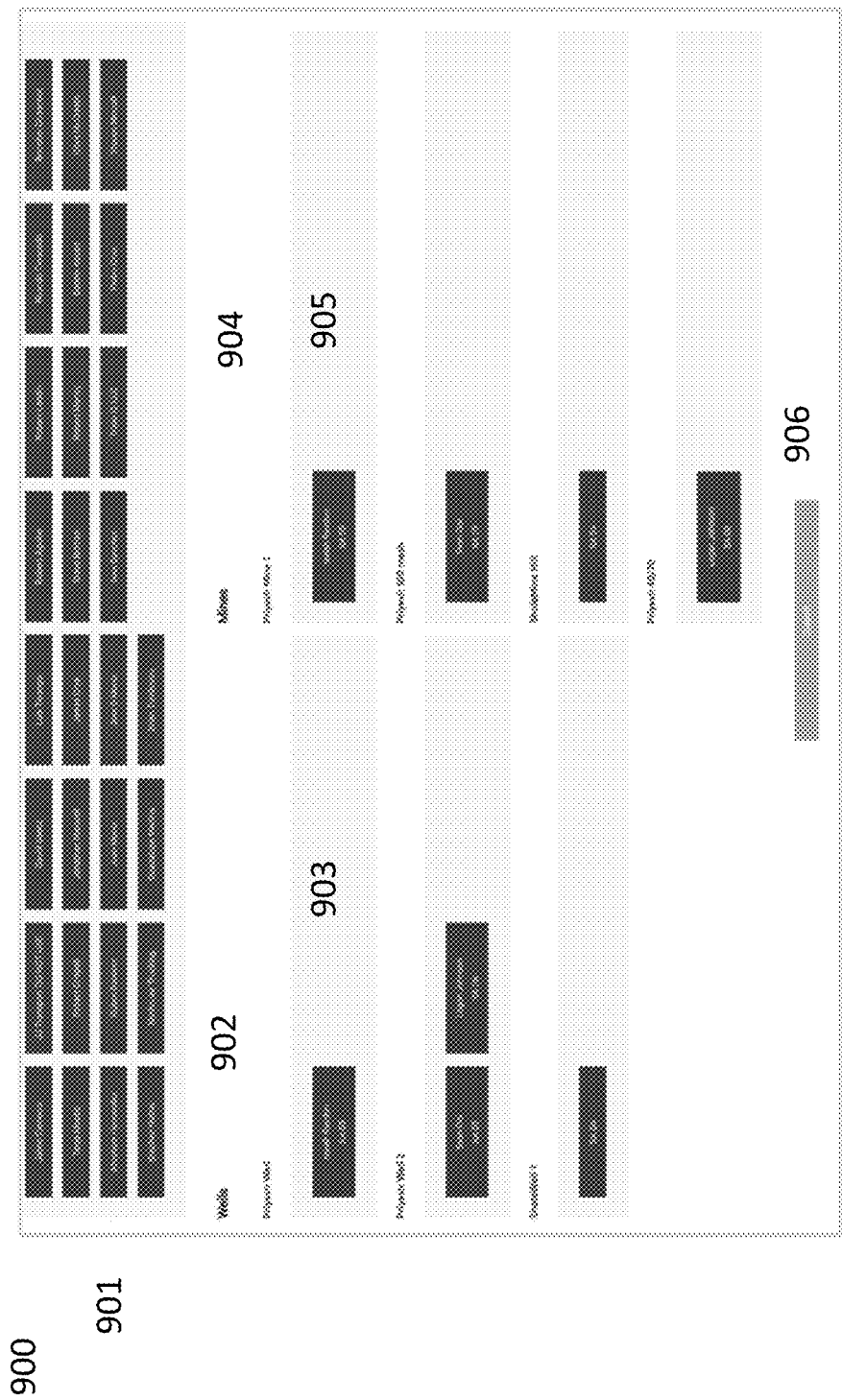
FIG. 9 shows a screenshot from a dispatch module according to an exemplary embodiment.
Figure 10:
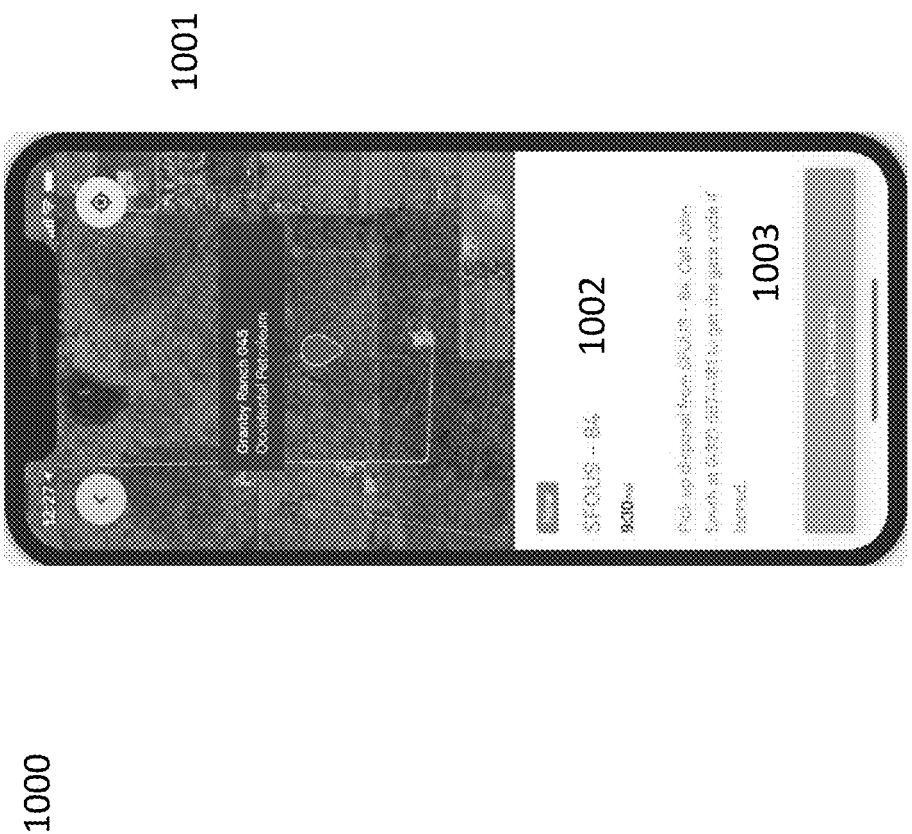
FIG. 10 shows a screenshot of a driver module according to an exemplary embodiment.

Continuing with FIG. 6, at step 612, the logistics system according to an exemplary embodiment dispatches transportation. For example, the LMO can work with a rail and trucking dispatcher (or multiple dispatchers, e.g., if multiple trucking companies are used) to assist transporters with adhering to the schedule. The dispatcher uses a dispatch module to assign trucks/rails to adhere to the schedule. Truck drivers receive assignments on a driver module indicating where they are to proceed and when. FIG. 9 shows a screenshot from a dispatch module according to an exemplary embodiment. FIG. 10 shows a screenshot of a driver module according to an exemplary embodiment.

Continuing with FIG. 6, at step 606, the logistics system according to an exemplary embodiment determines sand logistics current status in a logistics app. In some embodiments, apps described herein may run on computing devices such as mobile devices, computers, servers, cloud computing systems, and other computing devices. For example, drivers begin picking up material and delivering it. Then in real time the app leverages real time data from the sensors and user input in the app to calculate the current status of the supply and demand of sand. Real time transport sensors 605$a$ input the status of frac operations including truck driver availability, traffic situations, and/or the like. Real-time supply sensors 605$b$ provide real-time supply information, such as sand production rates at one or more mines, on-site storage at one or more mines or wells and/or transloads, among other supply information. Real-time demand sensors 605$c$ provide information in real time about resource demands, such as consumption rates at one or more wells, on site storage at one or more mines or wells, among other demand information. Mines and transloads or well sites may, for example, become inoperable and unable to support production operations, which is a failure point. Onsite coordinators can perform real time logistics app updates 604 to update the logistics app with this status, as well as other data such as observed levels of materials, stages of progress and other aspects of frac operations. The logistics app can also receive updates from the driver apps (e.g., indicating optimizations that have been selected). The logistics system uses the real-time updates from the logistics app, driver app, and the real-time sensors in step 606 to determine the current sand logistics status.

Figure 17:
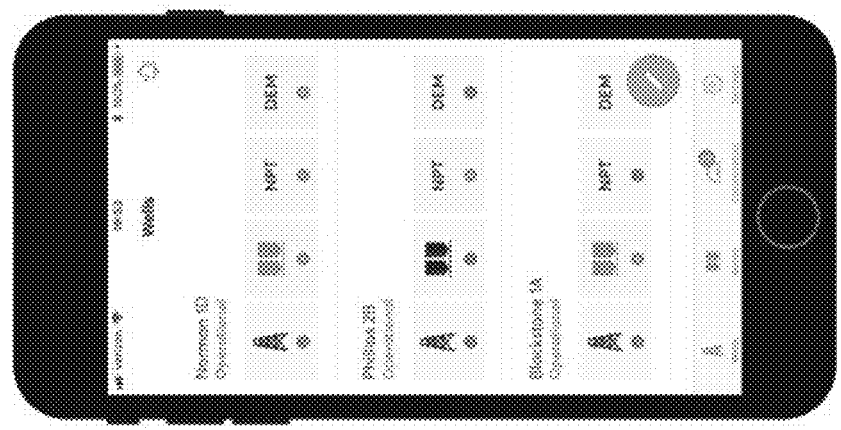
FIG. 17 illustrates an example of a logistics module indicating a failure at one or more mines that have deliveries scheduled for the listed wells and potential NPT and demurrage impacts according to an exemplary embodiment.
Figure 18:
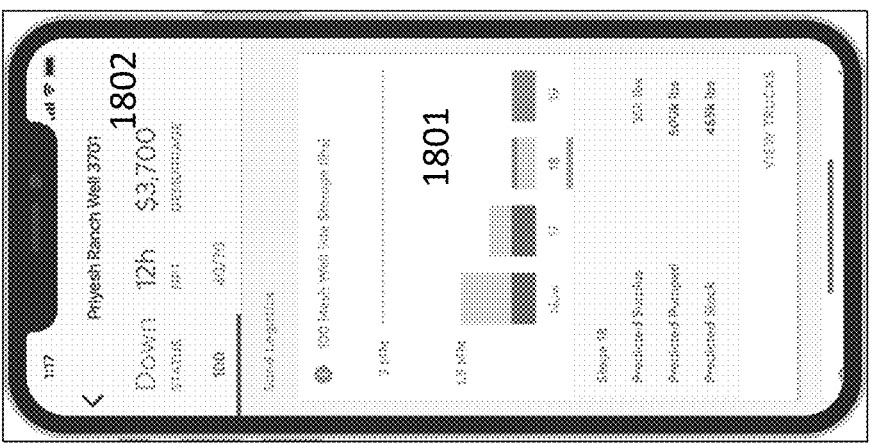
FIG. 18 shows an example of a predicted impact on well site storage of sand from the change illustrated in FIG. 17 according to an exemplary embodiment.

Continuing with FIG. 6, at step 607, the logistics system makes future sand logistics predictions and determines consequences. For example, a logistics app performs calculations to predict the future status of the supply and demand of sand. The app also shows the consequences (e.g., positive or negative) of the prediction by quantifying it into factors such as NPT and demurrage. At step 608, the logistics system determines if the prediction (e.g., the NPT and demurrage prediction) is acceptable. If the predictions are acceptable, the method moves to step 610. If the predictions are not acceptable, the method moves to step 609 and performs an optimization algorithm. The algorithm can react to some or all of the above changes in inputs to the sand logistics prediction step 607, including inputs from 604, 605, and 606. FIG. 17 illustrates an example of a logistics module indicating a failure at one or more mines that have deliveries scheduled for the listed wells and potential NPT and demurrage impacts according to an exemplary embodiment. FIG. 18 shows an example of a predicted impact on well site storage of sand from the change illustrated in FIG. 17 according to an exemplary embodiment.

In some embodiments, step 607 comprises a simulation algorithm and outputs what predicted health of sand logistics is. In some embodiments, step 607 may keep levers static coming in from the real time sensors and modules. The objective at 607 may include determining, based on current inputs, how pickups/drop-offs will proceed based on the current scenario. In some embodiments, the inputs to 607 may include may include one or more of the following at one or more wells: Number of stages at well; Latitude/Longitude of well; Prefill Date; Frac Date; Total number of trucks available; Unload Time; Truck Type; Truck Load; 24-hour demurrage threshold; Storage capacity by mesh type; and/or Mines available to supply this well. In some embodiments, the inputs may include truck assignments that have been made in the dispatch module. In some embodiments, the output of step 607 may include predicted NPT and predicted demurrage. In some embodiments, step 607 may take the real-time inputs (e.g., with or without modification) and run a simulation that indicates what NPT and demurrage will be if there are no changes to the inputs. In some embodiments, algorithm 607 may use one or more computing techniques such as extrapolation techniques, interpolation techniques, artificial intelligence methods, machine learning, data set comparisons, reinforcement, supervised learning, unsupervised learning, neural networks, Bayesian networks, and R2 convergence techniques.

In some embodiments, step 609 comprises an algorithm to optimize predicted health of last mile logistics if NPT and demurrage are not acceptable. Step 609 may include one or more of the following objections: predicted NPT, demurrage, and/or utilizing least amount of trucks/rails. In some embodiments, the inputs to step 609 may include may include one or more of the following at one or more wells: Number of stages at well; Latitude/Longitude of well; Prefill Date; Frac Date; Total number of trucks available; Unload Time; Truck Type; Truck Load; 24-hour demurrage threshold; Storage capacity by mesh type; and/or Mines available to supply this well. In some embodiments, the inputs may include truck assignments. In some embodiments, the outputs of step 609 may include one or more of the following: a schedule for trucks (e.g., shown in FIG. 8), a schedule for sand needed by stage (e.g., shown in FIG. 8), optimized pickup and drop-off locations, schedule of rails, predicted NPT, and/or predicted demurrage. In some embodiments, the algorithm may optimize factors such as predicted NPT, demurrage, and/or trucks/rail utilization using one or more of the following: number of trucks/rails, pickup locations, drop-off locations. In some embodiments, step 609 may take the inputs and creates a schedule of trucks and rails that result in the a reduced or the lowest numbers for NPT, Demurrage and Truck utilization. There are thresholds for acceptable levels of NPT and Demurrage (608) and the algorithm may re-run with different factors if the results are below threshold. For example, if the threshold for NPT is 10 hours and the algorithm generates a schedule that results in NPT of 12 hours, it may re-run and attempt to raise the number of trucks. Another example, if the threshold for demurrage is $8,500 and the algorithm generates a schedule that results in a demurrage of $10,000, it will re-run and attempt to decrease the number of trucks. It may also try to send trucks to other pickup or drop-off locations. In some embodiments, algorithm 609 may use one or more computing techniques such as extrapolation techniques, interpolation techniques, artificial intelligence methods, machine learning, data set comparisons, reinforcement, supervised learning, unsupervised learning, neural networks, Bayesian networks, and R2 convergence techniques.

Continuing with FIG. 6, at step 610, the logistics system according to an exemplary embodiment performs predictive diagnostics and develops an optimization plan for the logistics app. For example, the logistics app utilizes an algorithm to perform diagnostics and develop the optimized plan. The algorithm may utilize advanced analytics and artificial intelligence to create a more efficient solution. The algorithm may also address failure points. For example, as discussed herein, various failure points occur during logistics operations. The logistics system can address such failure points by adjusting schedules and recommending optimizations to the LMO. In some embodiments, the logistics method 600 can include various steps for one or more of real-time information monitoring of the present as well as prediction/optimization for the future. The logistics method 600, for example, can focus on steps for collecting and analyzing real-time information of the present. For example, the logistics method 600 can perform steps 601, 602, 603, 604, 605a, 605b, 605c, 606, and 612 for collecting and analyzing real-time information of the present.

FIG. 7 shows a screen from a job set up application 700 according to an exemplary embodiment. The application 700 allows a user to enter identifying details of the location (e.g. Name 701, Latitude 702 in FIG. 7) and demand details outlining the schedule of consumption of sand for that location (e.g. Prefill Date 703, Total # of Stages 704, Frac Date 705, Unload Tim 706, Truck Load 707), storage units on location and their capacity (e.g., to determine the maximum amount of sand that can be held at the well pending consumption) (e.g. storage 708), and the mines/sand supply points that this location has contract agreements with and is allowed to pull sand from, if desired (e.g. mines 709).

FIG. 8 shows an example of an optimized schedule for one mine and one well according to an exemplary embodiment. FIG. 8 shows a screen 800 from an app that may be the output of step 602 from FIG. 6, showing a schedule for the frac operation. In this example, the schedule 801 is shown for well Dodger 18L but the schedule can include multiple wells. The schedule includes scheduling information 802, which can indicate, for example, how many trucks should be used in the frac, what mine they should pick up their loads from, what type or mesh of load and what time they should depart. Well information 803 may include details of the well name and location. Sand information 804 may include a type of sand "mesh" in addition to details on various stages of the frac taking place at the well. Mine information 805 may also include information about a mine that is the source of the sand.

FIG. 9 shows a screenshot from a dispatch module according to an exemplary embodiment. FIG. 9 shows a dispatching app 900 such as dispatching app 410 in further detail. Dispatching app 900 may be used by a trucking company dispatcher after the dispatcher has received a schedule (e.g., detailed in FIG. 8). The dispatching app 900 presents the user with a list of available truck drivers 901 and it assists the truck dispatcher with assigning drivers to both wells and mines. The first column 902 lists out known active wells. A user can assign a truck driver to a well using interface 903. Additionally, the user can assign truck drivers to mines. The list of mines (e.g., 804 in FIG. 8) shows some or all truck drivers that have been associated with each mine, as shown for example at interface 905.

FIG. 10 shows a screenshot of a driver module according to an exemplary embodiment. FIG. 10 shows a driver module 1000 (e.g., from the driver app 411 in FIG. 4). Driver module 1000 displays on a map 1001 of a destination that a driver should travel to for completion of work. It also shows a text display 1002 of current work that the driver is completing and allows the driver to press a button 1003 to receive directions to the destination.

Figure 11:
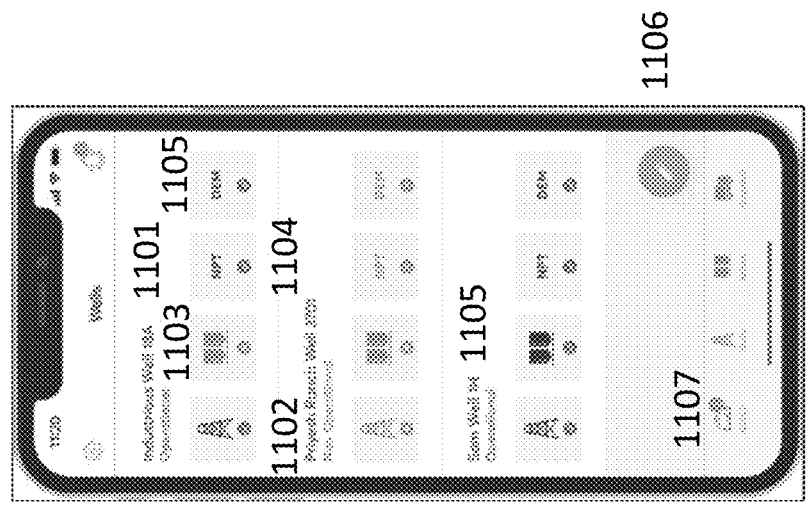
FIG. 11 shows a screenshot from a logistics module indicating a status of multiple wells, their associated mines, and the status of NPT and demurrage for each as related to a pre-defined alerting threshold according to an exemplary embodiment.

An LMO may observe progress via a logistics module, as illustrated in FIGS. 11-16. FIG. 11 shows a screenshot from the logistics module indicating the status of multiple wells, their associated mines, and the status of NPT and demurrage for each as related to a pre-defined alerting threshold according to an exemplary embodiment. FIG. 11 shows the "Wells" screen 1100 from a logistics app (e.g., logistics app 410 in FIG. 4). The logistics app may include, e.g., four tabs 1107 along the bottom and when the "wells" tab is pressed, the user is brought to the "Wells" Screen 1100. Rows are listed which show individual wells (e.g., wells 1101, 1105). Each row lists the well name (in the case of well 1101 it is "Industrious Well 18A") and status (e.g., "operational" for well 1101). Below the name and status are 4 boxes showing different information about the well (e.g., icons 1102, 1103, 1104 and 1105). The first box 1102 shows whether the well is operational or not. If it is operational, a green checkbox appears, if it is not operational, a red "X" appears in a circle. The second box 1103 indicates the state of the sand supply that is being used to sustain operations at the well. If the sand supply is adequate to support operations, a green checkbox appears, if it is not adequate, a red "X" appears in a circle. In the example in 1103 the sand supply is not adequate because a red X appears. Box 1104 shows whether NPT (Non Productive Time) is considered acceptable or not. If NPT is acceptable then a green checkbox appears, if it is not then a red "X" appears in a circle. Box 1105 shows whether demurrage is considered acceptable or not. If demurrage is acceptable, then a green checkbox appears, if it is not acceptable then a red "X" appears in a circle. Users can click the edit icon 1106 to edit parameters of the well and re-run optimizations 609 to attempt to avoid unacceptable situations.

Figure 12:
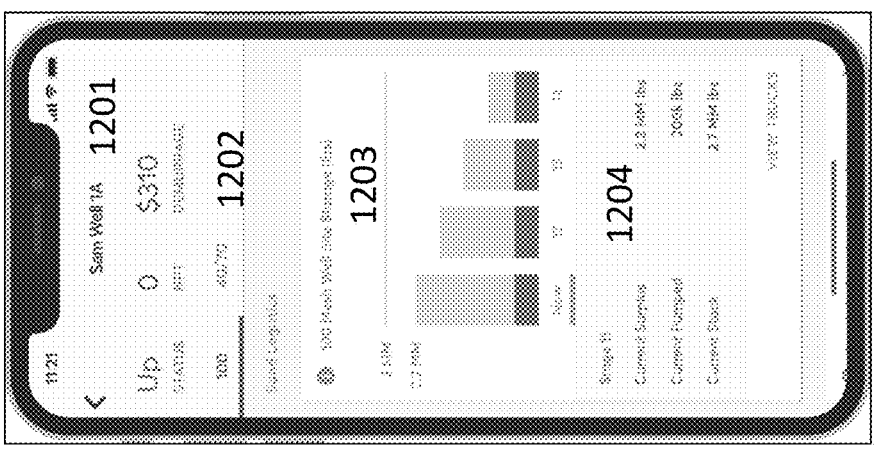
FIG. 12 shows a screenshot from a logistics module indicating an actual and predicted status of on-site storage at a well according to an exemplary embodiment.

FIG. 12 shows a screenshot from the logistics module indicating the actual and predicted status of on-site storage at a well according to an exemplary embodiment. FIG. 12 shows the well detail screen 1200. This screen within the logistics app may be reached by tapping on one of the wells shown in FIG. 11. In this example the well 1201 that has been detailed is "Sam Well 1A". A brief list of status items 1201 is shown indicating whether the well is up or down, whether there is any NPT or Demurrage, for example. Two tabs 1202 are shown allowing the user to view supply of sand to that well by mesh type (e.g., 100 or 40/70 in this example). Clicking on one of the meshes shows bar charts 1203 indicating status of that sand by frac stage. The bars indicate safety stock levels in the darker color and levels beyond safety stock in lighter color above the darker bars. For any stage, detail 1204 is shown on that stage when it bar is tapped by the user. This screen allows the LMO to look forward and predict how what sand levels will be as the frac progresses.

Figure 13:
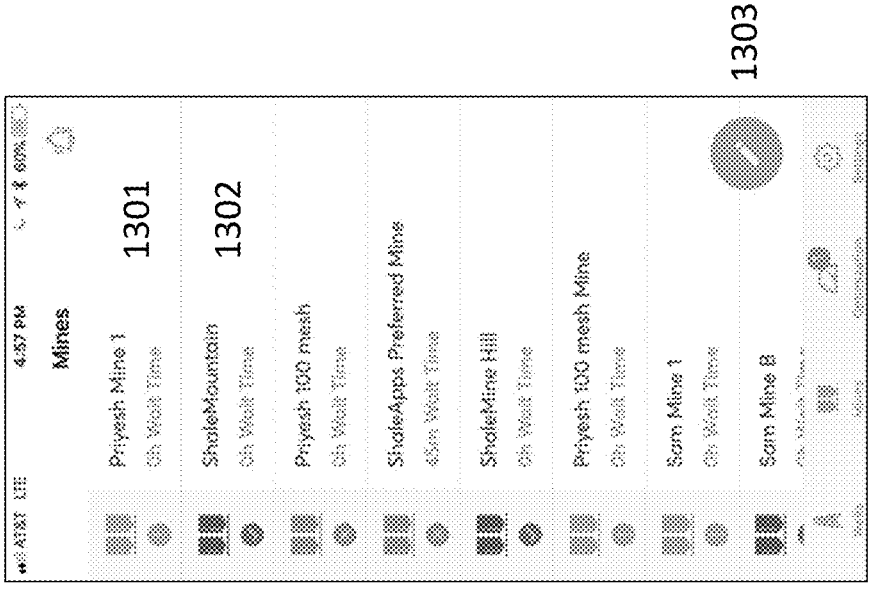
FIG. 13 shows a screenshot of a logistics module indicating available mines or transloads along with their status and current wait times according to an exemplary embodiment.

FIG. 13 shows a screenshot of a logistics module indicating the available mines or transloads along with their status and current wait times according to an exemplary embodiment. FIG. 13 shows the mine screen 1300. This screen may be displayed by a logistics app and may be reached by tapping on the mines tab at the bottom of the logistics app (e.g., as shown in FIG. 11). The mine screen 1300 lists some or all known mines (e.g., mines 1301 and 1302) and their current status along with known wait times at each mine. In this example, Priyesh Mine 1 is experiencing availability problems (indicated by exclamation point below mine icon) and Shale Mountain is not experiencing problems (indicated by check mark below mine icon). Users can click the edit button 1303 to edit information about the mines for recalculation in an optimization algorithm such as optimization algorithm 609.

Figure 14:
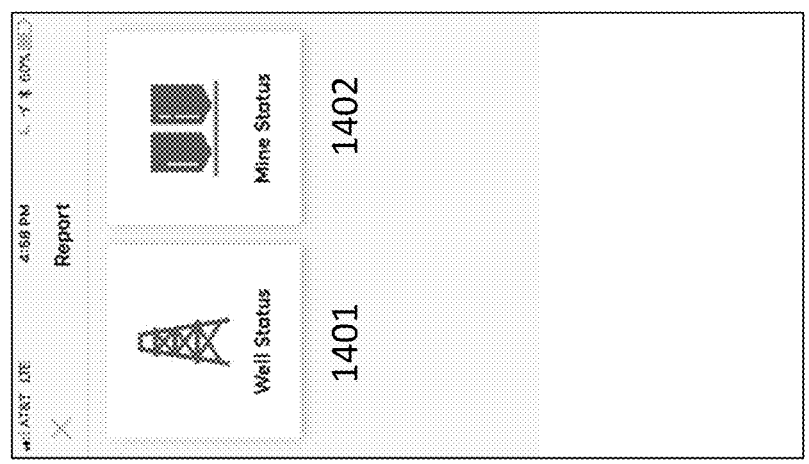
FIG. 14 shows a screenshot of a logistics module's well/mine status reporting according to an exemplary embodiment.

FIG. 14 shows a screenshot of a logistics module's well/mine status reporting according to an exemplary embodiment. FIG. 14 shows the report screen 1400. The user can report that a mine or well is experiencing a status change (e.g., down or up) using this screen. If a well has had a status change, the user may select well status 1401. If a mine has had a status change, the user may select mine status 1402. Once a well or mine is reported to have a status change, an alarm may be sent to an LMO who confirms the alarm (e.g., as shown in FIG. 15).

Figure 15:
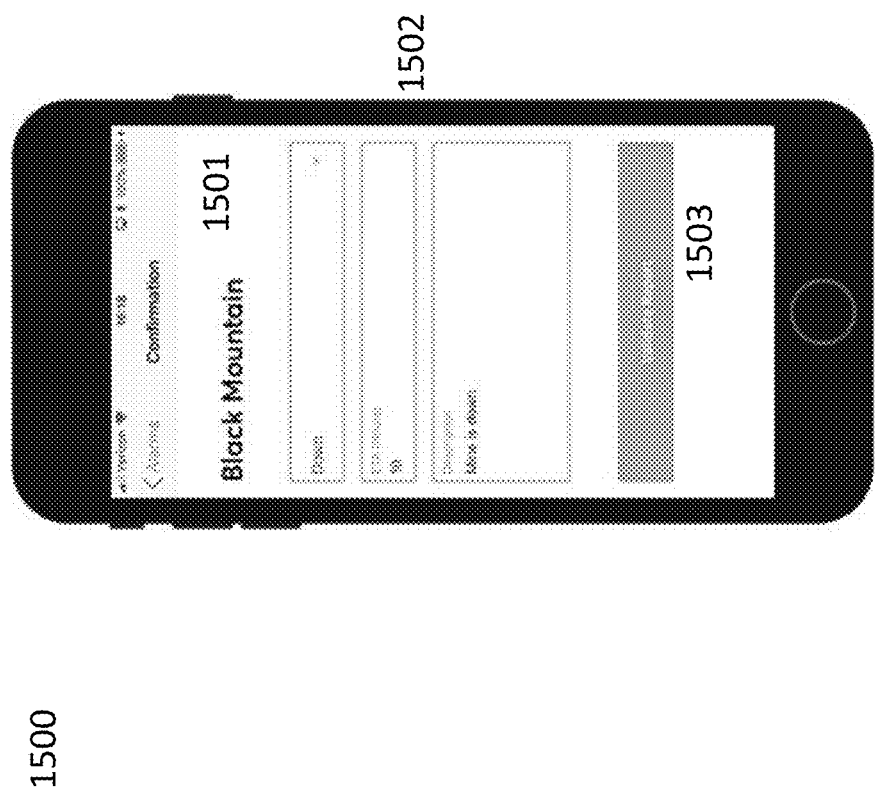
FIG. 15 shows a screenshot of a logistics module's well/mine status reporting according to an exemplary embodiment.

FIG. 15 shows a screenshot of the logistics module's well/mine status reporting according to an exemplary embodiment. FIG. 15 shows the confirmation screen 1500 in which the LMO can confirm that a report of mine or well status change (e.g., as shown in FIG. 14) is correct. The LMO views the name of the mine or well 1501, and the information included in the alert 1502, then selects the validate button 1503 button to validate the report.

Figure 16:
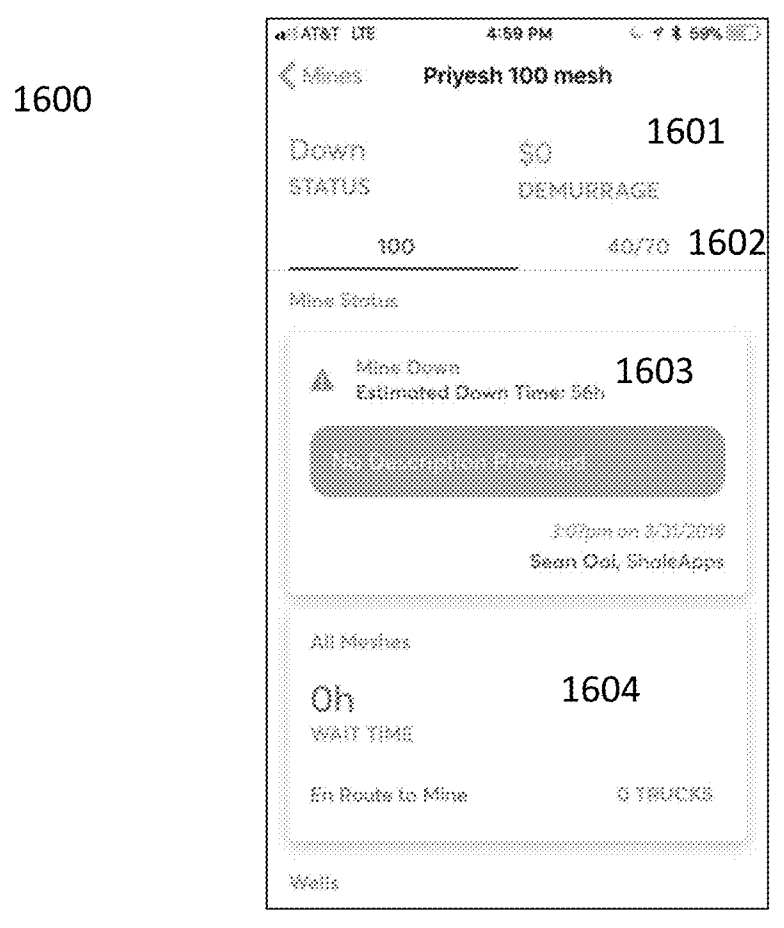

FIG. 16 shows a screenshot from the logistics module indicating a mine estimated to be down for 56 hours according to an exemplary embodiment. FIG. 16 shows an example of a mine detail screen 1600, which shows detailed information about a mine. In this example, the Priyesh 100 Mine is shown (e.g., selected via the interface shown in FIG. 13). A brief status 1601, e.g., including up/down and demurrage is shown at the top of the screen. Tabs 1602 are presented indicating meshes, in this example the two meshes shown are 100 and 40/70, and 100 has been selected. The status for mesh 100 is that the mine is down, as indicated by mine status 1603 and an expected time of 56 hours is shown until the mine will be back up. Additionally, a window 1604 also shows expected truck wait times for all meshes and how many trucks are en route to mines at the moment.

FIG. 17 illustrates an example of a logistics module indicating a failure at one or more mines that have deliveries scheduled for the listed wells and potential NPT and demurrage impacts according to an exemplary embodiment. FIG. 17 shows a well screen 1700 similar to that of 1100 however in this example both NPT and Demurrage are shown to be at unacceptable levels in display area 1701 as evidenced by the "X" marks under both NPT and Dem in the first row. This is an indicator to the LMO that the sand supply issues may cause unacceptable NPT and Demurrage impacts and that action should be taken to mitigate this situation.

FIG. 18 shows an example of a predicted impact on well site storage of sand from the change illustrated in FIG. 17 according to an exemplary embodiment. FIG. 18 shows a mine screen 1800 similar to that of 1200 in FIG. 12, however in this example, the mine is predicted to experience a sand shortage in stage 18 of the frac, as shown in display area 1801. The resulting shortage results in NPT and Demurrage as indicated in the top of the screen 1802. This situation may be important for the LMO to resolve as real cost impacts may be rapidly realized.

FIG. 19 shows is a table 1900 demonstrating an example of how different failure points are detected (data), the failure points themselves, and examples optimizations according to an exemplary embodiment. Row 1901 illustrates an example in which a sensor receives frac van sensor data indicating that sand is running low at a well (e.g., Well A 503 in FIG. 5). In response, the logistics system according to an exemplary embodiment can route more trucks to the well (e.g., Well A 503 in FIG. 5). Row 1902 shows an example of a sensor detecting silo sensor data indicating a first mine (e.g., Mine A 501 in FIG. 5) is down and a logistics app for a sand mine coordinator indicating a first mine (e.g., Mine A 501 in FIG. 5) is down in a logistics module. In response, the logistics system according to an exemplary embodiment can route trucks from a first mine (e.g., Mine A 501 in FIG. 5) to a second mine (e.g., Mine B 502 in FIG. 5). Row 1903 shows an example in which waypoints from a driver app indicate long wait times at a first mine (e.g., Mine A 501 in FIG. 5). In response, the logistics system according to an exemplary embodiment can route trucks from a first mine (e.g., Mine A 501 in FIG. 5) to a second mine (e.g., Mine B 502 in FIG. 5). Row 1904 illustrates an example in which waypoints from a driver app indicate long wait times at a first well (e.g., Well A 503 in FIG. 5). In response, the logistics system according to an exemplary embodiment can route trucks from a first well (e.g., Well A 503 in FIG. 5) to a second well (e.g., Well B 504 in FIG. 5). Row 1905 illustrates an example in which a well site coordinator updates a logistics app indicating a first well (e.g., Well A 503 in FIG. 5) is down due to wireline issues. In response, the logistics system according to an exemplary embodiment can route trucks from a first well (e.g., Well A 503 in FIG. 5) to a second well (e.g., Well B 504 in FIG. 5). Row 1906 illustrates an example in which a sand mine sensor indicates one of the lanes at a first mine (e.g., Mine 501 A in FIG. 5) is down. In response, the logistics system according to an exemplary embodiment can route trucks from a first mine (e.g., Mine A 501 in FIG. 5) to a second mine (e.g., Mine B 502 in FIG. 5).

Figure 20:
FIG. 20 shows a screen shot displaying suggested optimizations for a "last mile operator" (LMO) according to an exemplary embodiment.

Continuing with the description of step 610 in FIG. 6, according to an exemplary embodiment, the logistics system can prepare an optimization plan with recommendations for optimization steps (e.g., diverting trucks from one or more mines to one or more other times). A new schedule and optimization recommendations may be sent (e.g., emailed, texted, or otherwise conveyed or communicated) to the LMO based on these recalculations. Additionally, the users can be shown the predictive diagnostic and optimization recommendations. FIG. 20 shows a screen shot displaying suggested optimizations for an LMO according to an exemplary embodiment.

In some embodiments, at step 611 in FIG. 6, the logistics system takes action via the logistics app. The LMO can take action with other users and communicate the new plan to the dispatcher. The dispatcher can communicate changes to the schedule to drivers using the app, as explained herein. For example, if sensors detected a long wait time at a well, the LMO can accept the optimization recommendations to route trucks to a different well, e.g., via the logistics app. The LMO can communicate this change of plan to the dispatcher who can in turn communicate it to the trucks. The LMO may also communicate directly with the transports (e.g., trucks). At step 612 in FIG. 6, the driver apps may provide feedback on current driver status (e.g., via real time transport sensors 605a) for use in determining the sand logistics current status for the logistics app in step 606.

Figure 21:
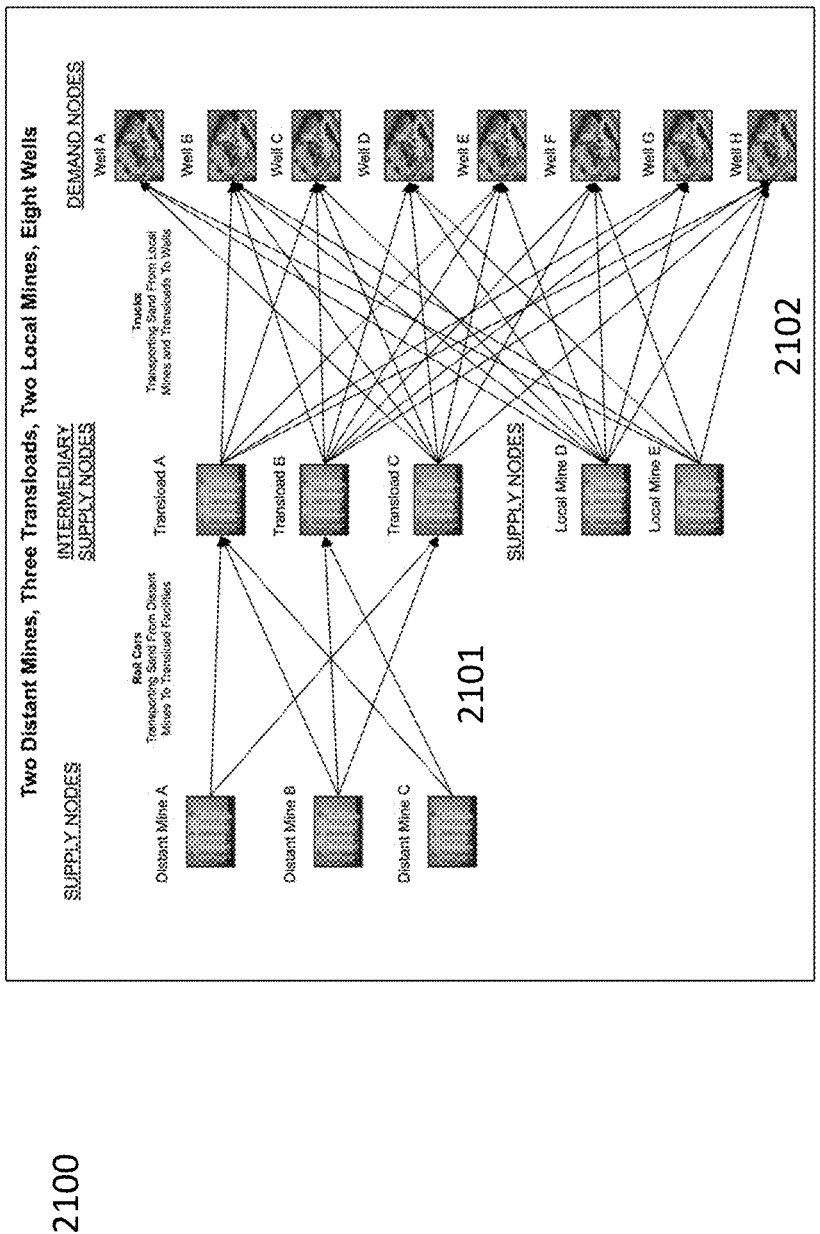
FIG. 21 shows an example of a logistics system with three distant mines which ship to three different transload facilities, two local mines, and eight wells consuming the sand according to an exemplary embodiment.

As noted above, the forgoing example uses a scenario with two mines and two wells for illustrative purposes. However, there can be multiple sources (e.g., mines) for the payload (e.g., sand) with various transports (e.g., some served by rail, some by truck) and there can be large numbers of destinations (e.g., wells) needing the payload (e.g., sand). The sheer numbers of permutations and combinations of trying to deal with all the failure points creates extreme complexity. The logistics system according to some embodiments described herein scales to address a large network of nodes to address this complexity. An additional example is provided here to illustrate how systems described herein handle a case with vastly more complexity. FIG. 21 shows an example of a logistics system with three distant mines which ship to three different transload facilities, two local mines, and eight wells consuming the sand according to an exemplary embodiment. Paths 2101 and 2102 illustrate an exemplary steady-state routing with no failure points.

Figure 22:
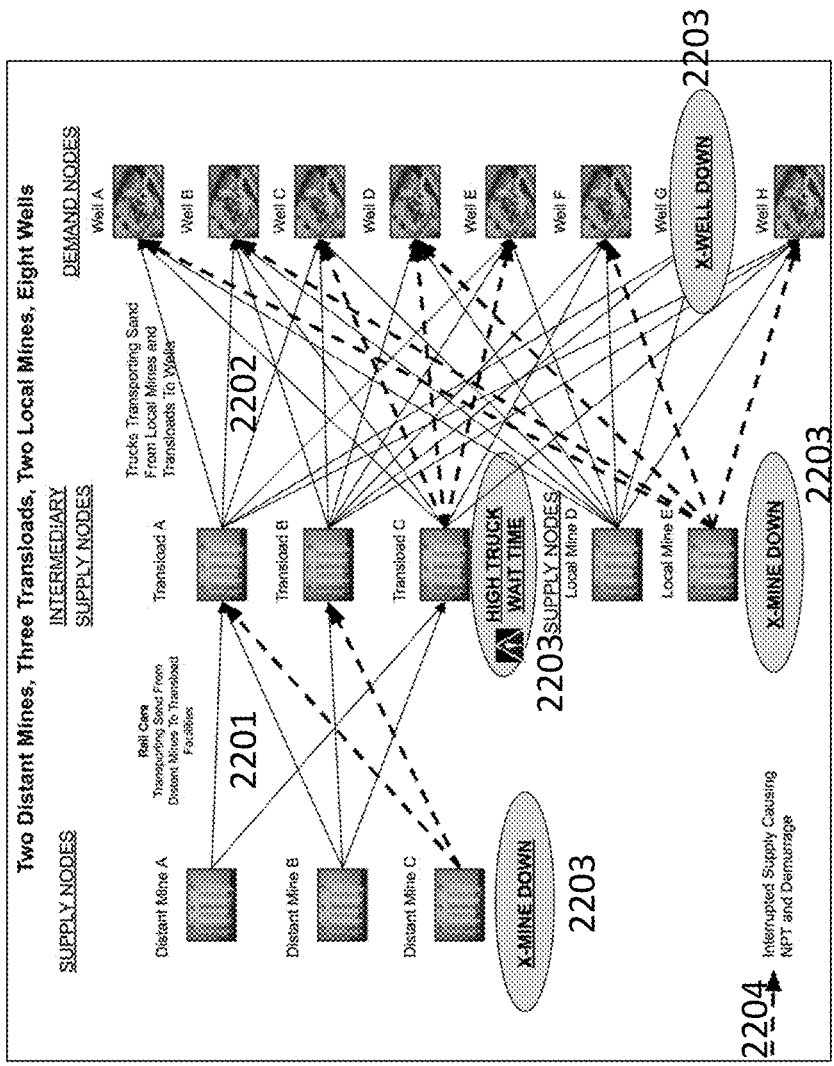
FIG. 22 shows an example of a logistics system with three distant mines which ship to three different transload facilities, two local mines, and eight wells consuming the sand with multiple points of failure according to an exemplary embodiment.

FIG. 22 shows an example of a logistics system with three distant mines which ship to three different transload facilities, two local mines, and eight wells consuming the sand with multiple points of failure according to an exemplary embodiment. In the example shown in FIG. 22, one or more paths 2201 and 2202 are interrupted by points of failure 2203 such as a mine down, a well down, and a high truck wait time resulting in interrupted supply paths 2204. Though each of the failure points may be independent (and/or related), the complexity introduced by each failure point affects the system extensively, and the solution to plan around the failure points can be very complex.

FIG. 23 shows a table of optimizations in response to detected points of failure according to an exemplary embodiment. Table 2300 shows how each failure point in FIG. 22 can result in optimizations according to an exemplary embodiment. As illustrated in row 2301, a sand mine sensor can detect that distant mine C is down. In response, the logistics system can perform an optimization to reduce or eliminate NPT and demurrage by re-routing rail traffic to other distant mines and/or changing drop-off locations for sand to another local mine or transload and rerouting trucks. As illustrated in row 2302, waypoints from a driver app can detect long wait times at transload station C. In response, the logistics system can perform an optimization to reduce or eliminate NPT and demurrage by changing the pickup location for sand to another local mine or transload and rerouting trucks. As illustrated in row 2303, frac van sensors can detect that well G is down. In response, the logistics system can perform an optimization to reduce or eliminate NPT and demurrage by rerouting trucks to different wells.

Figure 24:
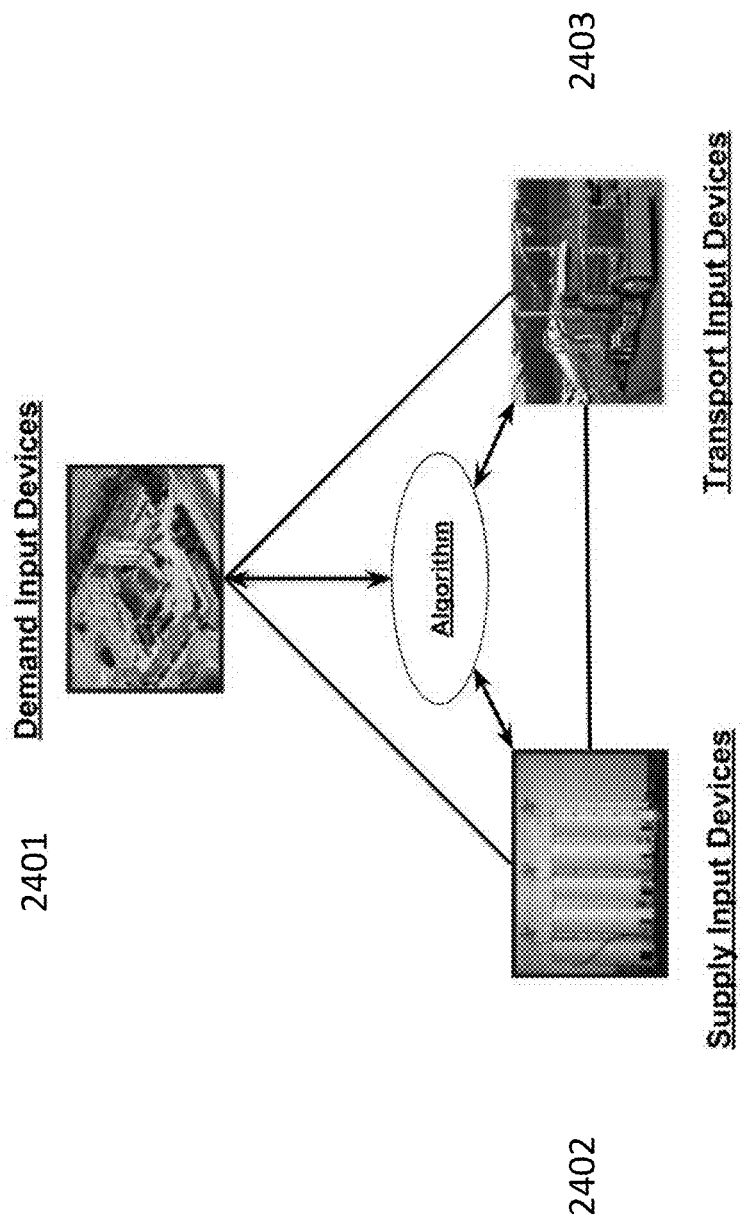
FIG. 24 shows a conceptual representation of an optimization algorithm according to one or more exemplary embodiments.

FIG. 24 shows a conceptual representation of an optimization algorithm 2400 according to one or more exemplary embodiments. The algorithm 2400 may dynamically optimize factors such as NPT and/or demurrage using inputs from one or more input devices (e.g., sensors and/or data entry devices), such as demand input devices (e.g., demand-sensors or data entry devices) 2401, supply input devices (e.g., supply sensors or data entry devices) 2402, and transportation input devices (e.g., transportation sensors or data entry devices) 2403. In some embodiments, the input devices such as demand input devices 2401, supply input devices 2402, and transportation input devices 2403 may provide real time inputs and/or non-real time inputs. In response to inputs from one or more input devices such as demand input devices 2401, supply input devices 2402, and transportation input devices 2403, a control system can dynamically adjust factors such as supply, demand, and transportation. Continuing with the exemplary example of sand logistics, supply of a resource such as sand can be dynamically adjusted at one or more mines and/or by adding or removing mines in response to inputs from one or more sensors. The location of the sand supply can also be dynamically adjusted in response to inputs from one or more sensors. For example, if demand input devices 2401 detect a demand center is temporarily un-operational, the algorithm can re-route the transporters and sand nodes to different demand centers to reduce demurrage of transporters. If the sand input devices 2401 detects the sand supply node is operational, the algorithm can reroute transporters to different sand supply nodes, to reduce demurrage for transporters and protect the demand node from having NPT. If the transport sensors detect delay in delivery of sand to the demand node due to long wait time at supply node, or traffic or other operational issues, the algorithm can suggest adding new transporters with the same or new supply nodes that are closer to the demand node. If the sensors across the demand node suggest lower consumption of sand than planned, the algorithm can predict utilization rate of sand and transport nodes and allow the sand and transport provider to sell their excess available resources in the spot market. The algorithm can also optimize NPT and/or demurrage when reacting to any combination of sensors across the supply node, demand nodes, and transportation nodes.

In some embodiments, the algorithm may, for example, reroute a transporter based on supply and/or demand inputs (e.g., from an input device such as a sensor or a data entry device). In some embodiments, a data entry device may receive automated inputs (e.g. from a transportation app, mobile device, computer, and/or one or more third party systems) and/or manual inputs (e.g., from a driver or dispatcher). In some embodiments, sensors may receive automated and/or manual inputs. For example, a location sensor can automatically track locations (e.g., of a transport) or may receive manual inputs (e.g., a QR code scanner that is manually activated when a truck arrives or departs from a location, for example). In some embodiments, inputs may be continuous or periodic. For example, a transporter location may be tracked continuously (e.g., through some or all of a route) or periodically (e.g. at particular points, regularly and/or irregularly).

Figure 25:
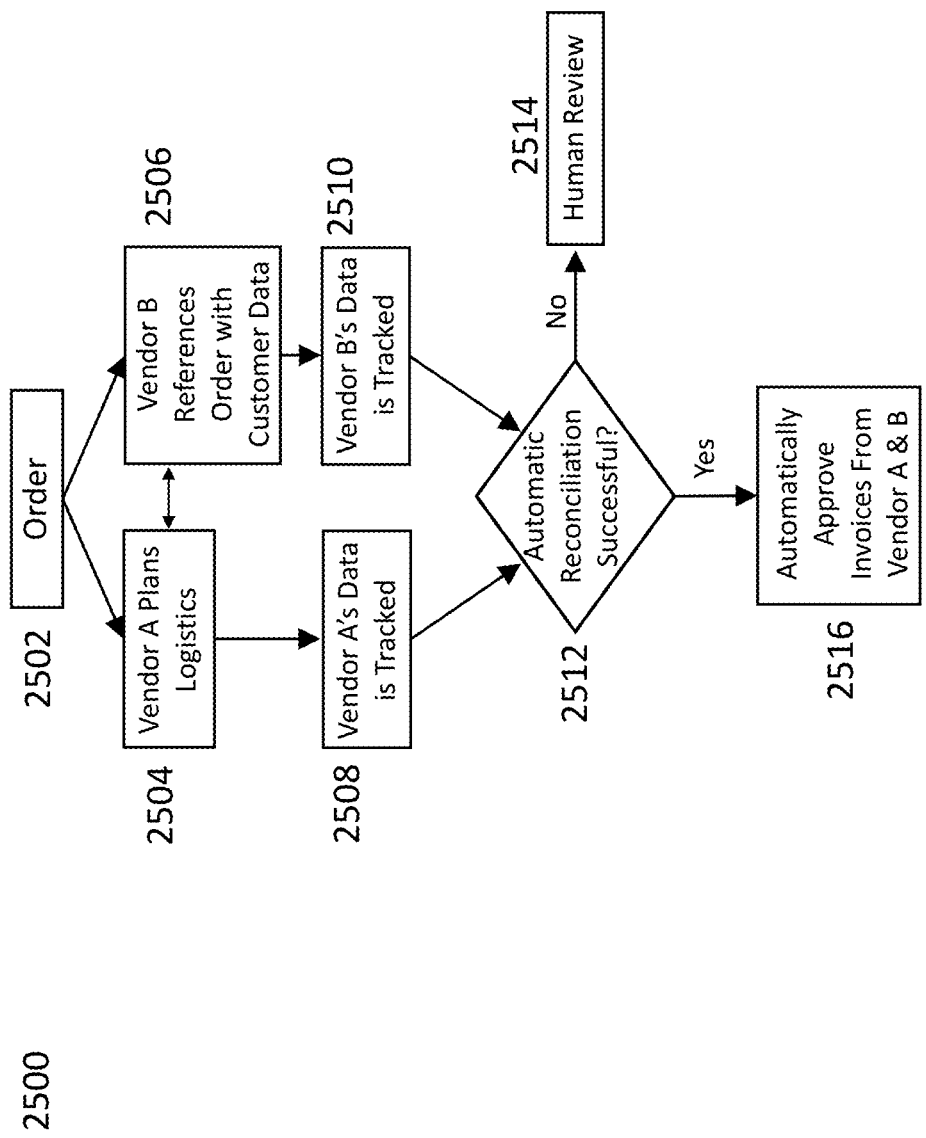
FIG. 25 illustrates a reconciliation method according to an exemplary embodiment.
Figure 27:
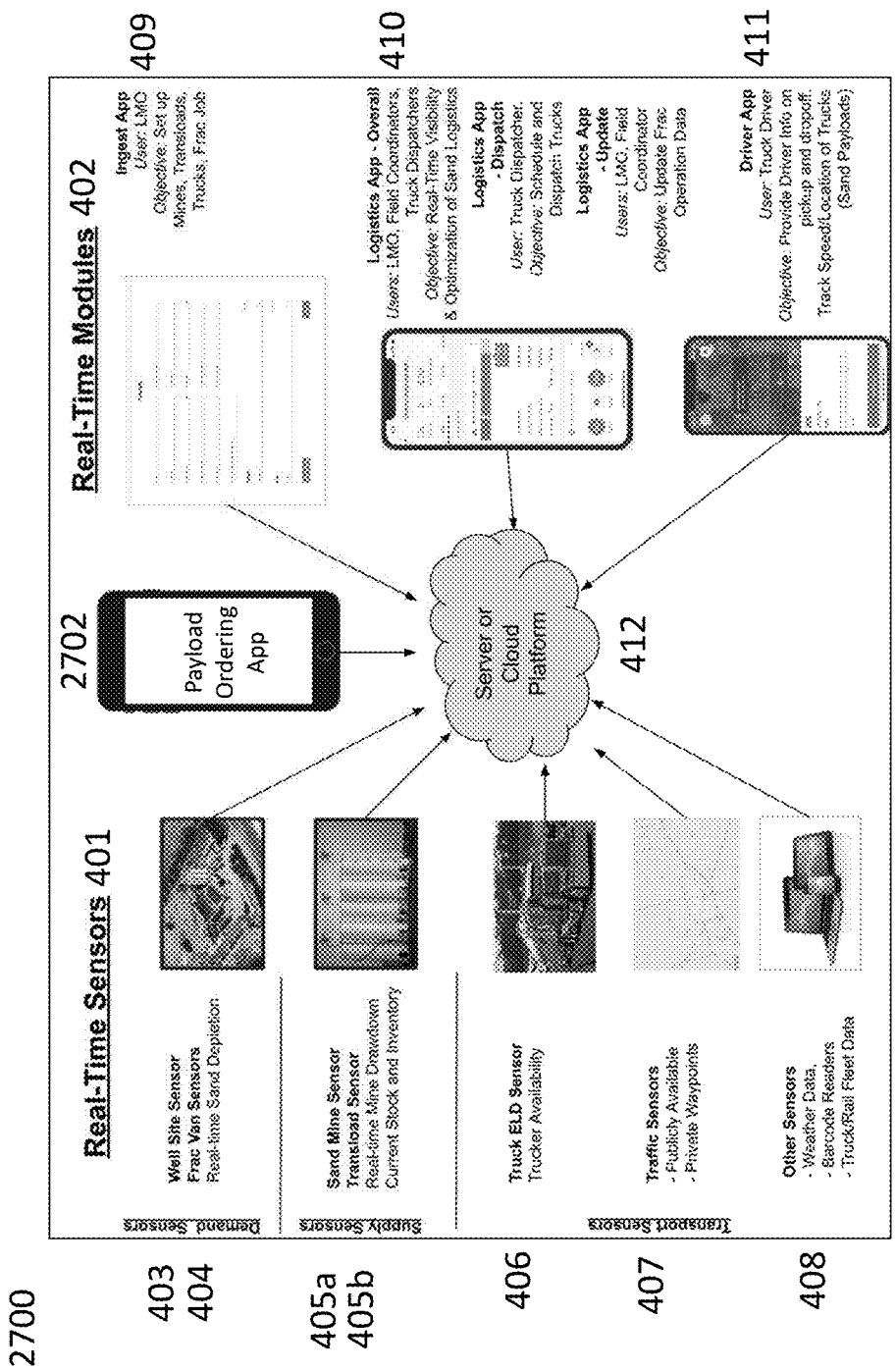
FIG. 27 illustrates a logistics system with an exemplary payload ordering module according to an exemplary embodiment.

FIG. 25 illustrates a reconciliation method according to an exemplary embodiment. An automatic reconciliation method 2500 may include receiving an order 2502 of payloads from a customer. The customer, for example, may submit the order 2502 via logistics system software or any other software comprising one or more applications or apps. FIG. 27 shows an exemplary payload ordering app 2702, which can be a part of a logistics system 2700. The customer, for example, may use the payload ordering app 2702 to submit the order 2502. In another example, the customer may use the logistics app 410 to submit the order 2502. In some embodiments, the payload ordering app 2702 and the logistics app 410 may be embodied together in one or more apps, which may operate on one or more devices. In some embodiments, the customer may place the order 2502 via email, via application programming interface (API) integration, or via any other electronic transmission. In some embodiments, the customer may place the order 2502 using traditional means such as via telephone/facsimile, via paper mail, or place an order in person. In some embodiments, once the order 2502 has been place, information associated with the order 2502 can be updated to the logistics system.

In some embodiments, the customer may submit the order 2502 based on real-time updates of the present conditions and/or based on the predictive diagnostics and optimized plan for the future, for example, based on any components or features within the logistics system 400 or the logistics method 600, and/or based on any other information available to the customer. In some embodiments, the order 2502 may be automatically submitted (e.g., via the payload ordering app 2702 and/or the logistics App 410) based on real-time updates of the present conditions and/or based on the predictive diagnostics and optimized plan for the future, for example, based on any components or features within the logistics system 400 or the logistics method 600. For example, as discussed herein, the logistics system or method can detect various failure points of the logistics operations. The logistics system or method can, not only address such failure points by adjusting schedules and recommending optimizations, but also, for example, by recommending the customer to submit the order 2502. In some embodiments, logistics system or method may address such failure points by automatically submitting the order 2502, for example, based on the preference of the users, based on the urgency of addressing such failure points, and/or based on the level of consequences of failing to address such failure points.

In some embodiments, as illustrated in FIG. 25, the order 2502 of payloads may be fulfilled by multiple vendors. For example, the payloads may be delivered by Vendor A (e.g., logistics vendor), but the payloads may be sold/rented by Vendor B (e.g., payload vendor). It will be appreciated that the use of two separate vendors (e.g., Vendor A and Vendor B) has been selected for illustrative purposes and that in other embodiments and applications, a customer's order of payloads may be fulfilled by one single vendor or fulfilled by more than two vendors.

Continuing with FIG. 25, at step 2504, the logistics system may route the order 2502 of payloads to Vendor A (e.g., logistics vendor) who may plan the logistics for the delivery of the payloads. In some embodiments, Vendor A may use the logistics system to plan the logistics. For example, the logistics system may detect availability of transporter and assign suitable transporter based on transport sensors (e.g., truck ELD sensors 406, traffic sensors 407, GPS data from driver app 411). In another example, the logistics system may also detect availability of the payloads at various vendors based on real-time sensors (e.g., sand mine sensors 405a, transload sensors 405b, etc.).

Continuing with FIG. 25, at step 2506, the logistics system may relay the order 2502 of payloads to Vendor B (e.g., payload vendor) who may sell/rent the payloads. In some embodiment, Vendor B may receive the order 2502 after Vendor A has accepted the order and planned out the logistics for the delivery of the payloads. In such case, Vendor B may receive the order 2502's logistics information with appropriate order information to reference it to customer data (e.g., the purchase order (PO) number, customer identifier, etc.). In some embodiments, both Vendor A and Vendor B may receive the order 2502 around the same period of time. In some embodiments, Vendor B may receive the order 2502 before Vendor A.

Continuing with FIG. 25, at step 2508, the logistics system may track Vendor A's data, for example, on logistics operations. The logistics system may track Vendor A's data on logistics operations, for example, by collecting various data from logistics sensors (e.g., payload ordering app 2702, logistics app 410, real-time sensors 401, driver app 411, or any other sensors or apps). The logistics system, for example, can track Vendor A's record of logistics operations such as the customer identifier, the bill of lading (BOL) number, the purchase order (PO) number, the time the payloads were picked up by the transporter (e.g., from barcodes read by scanner at the pick-up site, driver app 411, manual input, etc.); the payload quantity, type, and price (e.g., from barcodes read by scanner at the pick-up site, weight sensors; driver app 411, manual input, etc.); the current location of the payloads (e.g., via GPS data from driver app 411, traffic sensors 407, etc.); various information related to the transporter such as transporter identifier, for example, a name or number identifying a transporter such as a truck/train and/or a transporter company (e.g., data from driver app 411); the time of payloads' drop-off to customer (e.g., from barcodes read by scanner at the drop-off site, driver app 411, etc.); and/or any other record/data related to Vendor A's logistics operations, for example, based on manual inputs from anyone involved with the logistics operations, any inputs such as document scanned using text recognition, and/or any other data entry methods. In some embodiments, the logistics system may track detailed time-line of Vendor A's logistics operation. For example, i) time the order 2502 was placed; ii) time the transporter began working; iii) time the transporter arrived at the pickup location; iv) time the transporter departed the pickup location; v) time the transporter arrived at the drop-off location; vi) time the transporter departed the drop-off location; and vii) any other timeline on the logistics operations associated with the order 2502.

In some embodiments, the logistics system may collect, compile, or update Vendor A's data (e.g., on logistics operations) in a predetermined configuration, for example, in a certain data format, table format, text format, sheet (e.g., spread sheet) format, time/date format, file name format, sheet name format, table name format, email address format, or any other data structure/name formats.

Continuing with FIG. 25, at step 2510, the logistics system may track or receive regular updates from Vendor B (e.g., payload vendor) on data, for example, on financial, billing, and transporter of the order 2502. The data related to the order 2502 from Vendor B, for example, can be updated via email, via application programming interface (API) integration, or via any other electronic transmission. In some embodiments, the data related to the order 2502 from Vendor B can include a similar category of data from Vendor A (e.g., logistics vendor).

In some embodiments, Vendor B can have an independent system for collecting the financial/billing data and any other data related to the order 2502. For example, Vendor B as the payload vendor, can independently track the customer identifier; the bill of lading (BOL) number; the purchase order (PO) number; the payload quantity, type, and price; a detailed timeline of the work performed on the payloads (e.g., time the order 2502 was placed, time the transporter began working, time the transporter arrived at the pickup location, time the transporter departed the pickup location, time the transporter arrived at the drop-off location, time the transporter departed the drop-off location, and any other timeline of work performed on the payloads); transporter identifier (e.g., a name or number identifying a transporter such as a truck and/or a transporter company); and/or any other record/data related to Vendor B's operations, for example, based on manual inputs from anyone involved with the operations, any inputs such as document scanned using text recognition, and/or any other data/information gathering methods.

In some embodiments, Vendor B (e.g., payload vendor) may collect the data using one or more sensors (e.g., time sensors, weight sensors, imaging sensors, bar code/card readers, RF ID sensors, non-contact radar sensors, acoustics-based "3D" sensors, mechanical "bob" sensors, guided wave radar sensors, and/or laser level sensors), manual inputs, any inputs such as document scanned using text recognition, and/or any other data/information gathering methods In some embodiments, Vendor B's data (e.g., on payloads) may be collected, compiled, or updated in a predetermined configuration, which can be identical, similar, parallel, or analogous to the predetermined configuration for collecting, compiling, or updating Vendor A's data (e.g., on logistics operations). In some embodiments, Vendor B may regularly update the logistics system with the collected data. For example, Vendor B's independent system for collecting and compiling the data may automatically send the gathered data to the logistics system in a predetermined configuration as described.

Continuing with FIG. 25, at step 2512, the logistics system can automatically reconcile Vendor A's data (e.g., logistic vendor's data on logistics operations) and Vendor B's data (e.g., payload vendor's data on payloads). In some embodiments, Vendor A's data and Vendor B's data may have been tracked and updated separately, and these two sets of data may need to be reconciled as the order 2502 is being fulfilled or once the order 2502 has been fulfilled. In some embodiments, the logistics system can automatically match electronically tracked/updated data from Vendor B (e.g., payload vendor) with the Vendor A's data (e.g., on logistics operations) that may have been already collected via various logistics sensors.

In some embodiments, the logistics system can detect the two sets of data (e.g., on the order 2502) from Vendor A and Vendor B for automatic reconciliation. For example, the logistics system can detect any combination of the customer name, Vendor A's name, Vendor B's name, or any predetermined configuration (e.g., certain data format, table format, text format, sheet format, time/date format, file name format, sheet name format, table name format, email address format, or any other data structure/name formats) from Vendor A and B's data. For example, if the logistics system detects one set of data from Vendor A and another set of data from Vendor B with the same or similar customer name, then the logistics system may further match/compare the two data sets for automatic reconciliation. In another example, the logistics system may detect matching Vendor A or B's name from both data sets from Vendor A and B, then the logistics system may further match/compare the data sets for automatic reconciliation. In yet another example, if the data sets on the order 2502 has been updated to the logistics system via email, the logistics system may detect certain preconfigured email address format to determine the data sets for further automatic reconciliation. In yet another example, the logistics system may detect certain preconfigured file name, sheet name, table name, or any other data or name format to determine the data sets for further automatic reconciliation.

In some embodiments, once the logistics system determines the two sets of data from Vendor A and B that are to be matched, the logistics system can further automatically reconcile the data values within the two data sets. In some embodiments, the logistics system can automatically reconcile the two data sets based on optimized order of matching, reliability factor, high-value factor, and/or fuzzy logic algorithm.

In some embodiments, the logistics system can match data values in a certain order or give more weight to certain data values, for example, based on the reliability of the data collection process. For example, in some embodiments, data values collected automatically by reliable machine-type (e.g., non-human) sensors can be more reliable than certain data entries collected manually by a person. In some embodiments, data values collected by reliable machine-type sensors may be matched with higher priority. In some embodiment, certain type of data may be of higher-value than other type of data. For example, depending on the customer or vendors, the quantity of the payload (e.g., the weight of the payload which can be directly associated with the cost of the payload) can be more important than the pick-up time of the payload. In such cases, the logistics system can prioritize matching the high-value data. The high-value data, for example, can be the quantity of the payload, price of the payload, the bill of lading (BOL) number, and/or any data related to the order 2502 as described herein, depending on the preference(s) of the users.

In some embodiments, some data values within the data sets from Vendor A and Vendor B may not be identical. For example, Vendor A's data (e.g., on logistics operations) may indicate the payload pick-up time as 9:00 am (e.g. collected via driver app 411, logistics app 410, etc.), whereas Vendor B's data (e.g., on payloads) may have indicate the payload pick-up time as 9:02 am (e.g., collected via Vendor B's independent time sensor(s) located at Vendor B's loading bay). In another example, certain data values within the data sets may be missing. In some embodiments, the logistics system can use a fuzzy logic algorithm to match the data values within the data sets that are not identical. For example, the logistics system can be configured with a fuzzy logic threshold to determine what constitutes a match. For example, the logistics system may determine that Vendor A's pick-up time data of 9:00 am and Vendor B's pick-up time data of 9:02 am are a match, if the two values fall within a certain fuzzy logic threshold. In some embodiments, the logistics system's fuzzy logic algorithm can be optimized for different categories of data and for different vendors. For example, if a vendor's time sensor inaccurately measures time 5 minutes late, then the logistics system's fuzzy logic algorithm can be optimized to consider such inaccuracy.

In some embodiments, at step 2516, the logistics system can automatically detect the set of matched data and approve the bills/invoices from Vendors A and B that are related to the matched set of data. In some embodiment, the logistics system can also generate and maintain a reconciled data base. For example, this reconciled data base may include all of the high-value data (e.g., the payload quantity, the payload price, the BOL number, etc.) that has been matched or may include any other matched data associated with the order 2502. In some embodiments, the logistics system can generate and maintain the reconciled data base not only from the order 2502, but also from any other orders that have been managed and automatically reconciled by the logistics system. For example, as the logistics system manages and automatically reconciles more and more orders, the logistics system may generate and maintain the reconciled data base associated with all of those orders. In some embodiments, at step 2514, the logistics system can automatically detect the set of unmatched data and flag the bills/invoices from Vendors A and B that are related to the unmatched set of data for review by human (e.g., users). In some embodiments, the logistics system may generate a report of unmatched set of data that can be analyzed and used to further optimize the automatic reconciliation algorithm. In some embodiments, the unmatched set of data that has been reconciled based on human review may be updated to the reconciled data base.

Figure 26:
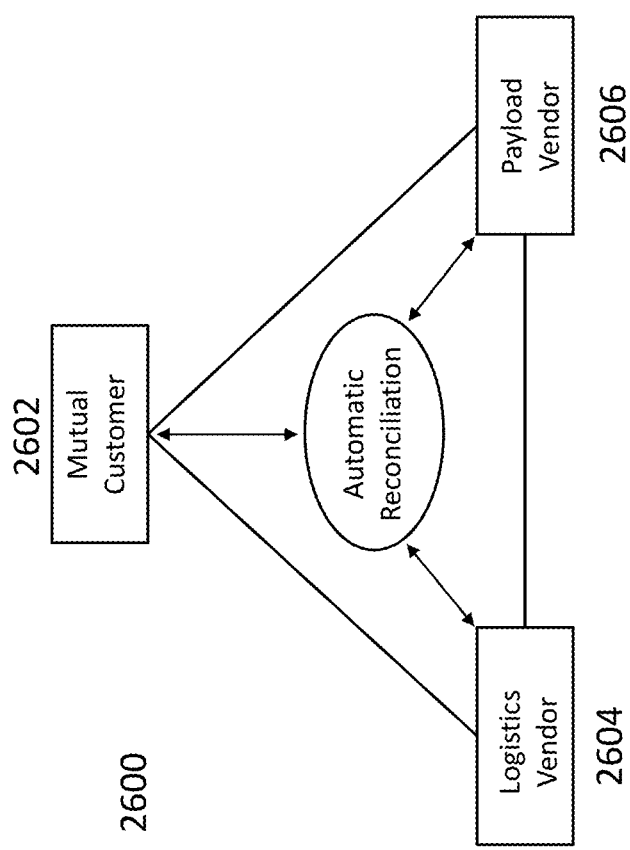
FIG. 26 shows a conceptual representation of an automatic reconciliation according to an exemplary embodiment.

FIG. 26 shows a conceptual representation of an automatic reconciliation according to an exemplary embodiment. The automatic reconciliation 2600 may automatically reconcile various data (e.g., sensor data, customer data, financial data, billing data, shipment data, transporter data, etc.) with each other and may reduce the need for human approval before the invoices can be submitted for invoicing or payment. In some embodiments, the automatic reconciliation 2600 may involve data from three exemplary parties: mutual customer 2602, logistics vendor 2604, and payload vendor 2606. For example, when the mutual customer 2602 submits an order for payloads, the logistics vendor 2604 may provide the delivery service for the mutual customer 2602, and the payload vendor 2606 may provide (e.g. sell or rent) the payloads for the mutual customer 2602. Various data associated with logistics vendor and various data associated with payload vendor can be automatically reconciled, for example, using the automatic reconciliation method 2500 illustrated in FIG. 25. This automatic reconciliation can help reconcile the payload data and/or invoices from the logistics and payload vendors and reduce 90% or higher manual approvals (e.g., almost everything can be automatically verified and reconciled).

FIG. 27 illustrates a logistics system with an exemplary payload ordering module according to an exemplary embodiment. A logistics system 2700 can be similar to the logistics system 400 in FIG. 4. The logistics system 2700 may, for example, include a payload ordering app 2702 component. The payload ordering app 2702, for example, can be used by customers to order various payloads for fracking operations. In some embodiments, the payload ordering app 2702 and the logistics app 410 may be embodied together in one or more apps, which may operate on one or more devices. Payload ordering app 2702 is illustrated as an app for illustrative purposes, but in some exemplary embodiments, any suitable hardware and/or software may be used, such desktop computers, laptop computers, specialized computing devices, and other hardware and/or software applications.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A system for transportation of a payload, the system comprising:
   a routing command subsystem implemented by at least one processor and a memory, the routing command subsystem configured to control transportation of the payload comprising a resource, and configured to be communicably coupled to:
   a first input device at a first location, the first input device configured to determine a first resource factor of the resource at the first location;
   a location input device associated with a transporter, the transporter configured to transport the resource, the location input device configured to determine a transporter location,
   the routing command subsystem further configured to:
      predict an availability of the resource at a supply node;
      detect a failure point in transportation of the resource;
      simulate a consequence of the predicted availability of the resource at the supply node by calculating a consequence factor;
      compare the consequence factor to a predefined threshold;
      when the consequence factor is not within the predefined threshold, change a first endpoint of a transporter route to a first alternate location based at least in part on the first resource factor and the transporter location, in order to increase a transportation utilization rate;
      receive first data associated with the first location and second data associated with the transporter;
      apply a fuzzy logic to match the first data and the second data, wherein the fuzzy logic comprises matching the first data and the second data by comparing a difference between the first data and the second data to a predefined fuzzy logic threshold;
      automatically reconcile the first data and the second data when the difference between the first data and the second data is within the predefined fuzzy logic threshold; and
      automatically determine, for a user, the first data and the second data when the difference between the first data and the second data is not within the predefined fuzzy logic threshold; and
a user interface configured to:
receive, from the user, an input to manually reconcile the first data and the second data that are automatically detected when the difference between the first data and the second data is not within the predefined fuzzy logic threshold; and
display, on a display device,
the first data and the second data that are automatically reconciled based on the fuzzy logic or manually reconciled based on the input from the user, and
the first alternate location as the first end point of the transportation route when the consequence factor is not within the predefined threshold.

2. The system of claim 1, wherein the first location comprises the supply node.

3. The system of claim 1, wherein the first location comprises a demand node.

4. The system of claim 1 further comprising:
a second input device at a second location, the second input device configured to determine a second resource factor at the second location;
wherein the changing the first endpoint of the transporter route further comprising changing the first endpoint of the transporter route to the first alternate location based at least in part on the second resource factor.

5. The system of claim 4, wherein the first location comprises a source node and the second location comprises a destination node.

6. The system of claim 1, wherein the first input device comprises a sensor.

7. The system of claim 1, wherein the first input device comprises a data entry device.

8. The system of claim 1, wherein the location input device comprises a sensor.

9. The system of claim 1, wherein the location input device comprises a data entry device.

10. The system of claim 1, wherein the first resource factor comprises an amount of the resource.

11. The system of claim 10, wherein the amount of the resource comprises a quantity of the resource at the first location or a weight of the resource at the first location.

12. The system of claim 10, wherein the amount of the resource comprises a quantity of the resource consumed at the first location or a weight of the resource consumed at the first location.

13. The system of claim 1, wherein the first resource factor comprises a rate of change of the resource.

14. The system of claim 1, wherein the first resource factor comprises a comparison of a resource quantity withdrawn at the supply node with a scheduled resource demand at a demand node.

15. The system of claim 1, wherein the first input device determines the first resource factor based at least in part on a real-time input.

16. The system of claim 1, wherein the first input device determines the first resource factor based at least in part on a periodic input.

17. The system of claim 1, wherein the location input device determines the transporter location based at least in part on a real-time input.

18. The system of claim 1, wherein the location input device determines the transporter location based at least in part on a periodic input.

19. The system of claim 1, further comprising a second input device associated with the transporter, the second input device configured to determine a second resource factor of the resource associated with the transporter.

20. The system of claim 19, wherein the second resource factor comprises an amount of the resource transported by the transporter or a weight of the resource transported by the transporter.

21. The system of claim 1, wherein the first endpoint of the transporter route comprises the supply node.

22. The system of claim 1, wherein the first endpoint of the transporter route comprises a demand node.

23. The system of claim 1, the routing command subsystem further configured to determine a transporter resource factor, wherein the transporter resource factor comprises a number of transporters transporting the resource.

24. The system of claim 1, the routing command subsystem further configured to direct a second transporter to transport the resource based at least in part on the first resource factor and the transporter location.

25. The system of claim 1, the routing command subsystem further configured to change a schedule for the transporter to transport the resource based at least in part on the first resource factor and the transporter location.

26. The system of claim 1, the routing command subsystem further configured to change a route of the transporter to include a first intermediate location based at least in part on the first resource factor and the transporter location.

27. The system of claim 1, wherein the changing the first endpoint of the transporter route further comprising predicting a demand of the resource at a demand node.

28. The system of claim 1, wherein the changing the first endpoint of the transporter route further comprising predicting a number of transporters available to transport the resource.

29. The system of claim 1, wherein the first resource factor depends on a second resource factor associated with a second resource.

30. The system of claim 1, wherein the payload comprises a combination of one or more resource, the resource comprises sand, chemicals, water, oil, gas, raw materials, finished goods, parcels, equipment, or personnel.

31. The system of claim 1, wherein the transporter comprises at least one of a rail car, a truck, or pipeline.

32. The system of claim 1, wherein the first input device comprises at least one of a node site sensor, a fracking van sensor, or a supply node sensor.

33. The system of claim 1, wherein the routing command subsystem further configured to change the first endpoint of the transporter route to the first alternate location based at least in part on the first resource factor, the transporter location, and a driver factor.

34. The system of claim 33, wherein the driver factor comprises at least one of a current duty status or a number of hours of service remaining.

35. A system for transportation of a payload, the system comprising:
a transporter selection subsystem implemented by at least one processor and a memory, the transporter selection subsystem configured to control transportation of the payload comprising a resource, and configured to be communicably coupled to:
a first input device at a first location, the first input device configured to determine a first resource factor of a resource at the first location;

a first location input device associated with a first transporter, the first location input device configured to determine a first transporter location;
a second location input device associated with a second transporter, the second location input device configured to determine a second transporter location;
a driver input device associated with a driver, the driver input device configured to determine a driver factor; and
the transporter selection subsystem further configured to:
predict an availability of the resource at a supply node;
detect a failure point in transportation of the resource;
simulate a consequence of the predicted availability of the resource at the supply node by calculating a consequence factor;
compare the consequence factor to a predefined threshold;
when the consequence factor is not within the predefined threshold, select the first transporter or the second transporter to transport the resource based at least in part on the first resource factor, the first transporter location, the second transporter location, and the driver factor, in order to increase a transportation utilization rate;
receive first data associated with the first location and second data associated with the driver;
apply a fuzzy logic to match the first data and the second data, wherein the fuzzy logic comprises matching the first data and the second data by comparing a difference between the first data and the second data to a predefined fuzzy logic threshold;
automatically reconcile the first data and the second data when the difference between the first data and the second data is within the predefined fuzzy logic threshold; and
automatically determine, for a user, the first data and the second data when the difference between the first data and the second data is not within the predefined fuzzy logic threshold; and
a user interface configured to:
receive, from the user, an input to manually reconcile the first data and the second data that are automatically detected when the difference between the first data and the second data is not within the predefined fuzzy logic threshold; and
display, on a display device,
the first data and the second data that are automatically reconciled based on the fuzzy logic or manually reconciled based on the input from the user, and
the first transporter or the second transporter to transport the resource when the consequence factor is not within the predefined threshold.

36. The system of claim 35, wherein the first location comprises the supply node.

37. The system of claim 35, wherein the first location comprises a demand node.

38. The system of claim 35, wherein the first input device comprises a sensor.

39. The system of claim 35, wherein the first input device comprises a data entry device.

40. The system of claim 35, wherein the first location input device comprises a sensor.

41. The system of claim 35, wherein the first location input device comprises a data entry device.

42. The system of claim 35, wherein the second location input device comprises a sensor.

43. The system of claim 35, wherein the second location input device comprises a data entry device.

44. The system of claim 35, wherein the first resource factor comprises an amount of the resource, and the resource comprises sand, chemicals, water, oil, gas, raw materials, finished goods, parcels, equipment, or personnel.

45. The system of claim 44, wherein the amount of the resource comprises a quantity of the resource at the first location.

46. The system of claim 44, wherein the amount of the resource comprises a quantity of the resource consumed at the first location.

47. The system of claim 35, wherein the first resource factor comprises a rate of change of the resource.

48. The system of claim 35, wherein the first resource factor comprises a comparison of a resource quantity withdrawn at the supply node with a scheduled resource demand at a demand node.

49. The system of claim 35, wherein the first input device determines the first resource factor based at least in part on a real-time input.

50. The system of claim 35, wherein the first input device determines the first resource factor based at least in part on a periodic input.

51. The system of claim 35, wherein the first location input device determines the transporter location based at least in part on a real-time input.

52. The system of claim 35, wherein the first location input device determines the transporter location based at least in part on a periodic input.

53. The system of claim 35, wherein the second location input device determines the transporter location based at least in part on a real-time input.

54. The system of claim 35, wherein the second location input device determines the transporter location based at least in part on a periodic input.

55. The system of claim 35, further comprising a second input device associated with the transporter, the second input device configured to determine a second resource factor of the resource associated with the transporter.

56. The system of claim 55, wherein the second resource factor comprises an amount or a weight of the resource transported by the transporter.

57. The system of claim 35, the transporter selection subsystem further configured to determine a transporter resource factor, wherein the transporter resource factor comprises a number of transporters transporting the resource.

58. The system of claim 35, the transporter selection subsystem further configured to direct the second transporter to transport the resource based at least in part on the first resource factor and the first transporter location.

59. The system of claim 35, the transporter selection subsystem further configured to change a schedule for the transporter to transport the resource based at least in part on the first resource factor and the first transporter location.

60. The system of claim 35, the routing command subsystem further configured to change a route of the transporter to include a first intermediate location based at least in part on the first resource factor and the first transporter location.

61. The system of claim 35, wherein the first resource factor depends on a second resource factor associated with a second resource.

62. The system of claim 35, wherein the driver factor comprises at least one of a current duty status or a number of hours of service remaining.

63. A system for transportation of a payload, the system comprising:
- a routing command subsystem implemented by at least one processor and a memory, the routing command subsystem configured to control transportation of the payload comprising a resource, and configured to be communicably coupled to:
- an amount sensor at a production operation at a first location, the amount sensor configured to determine an amount of a resource at the production operation, the production operation using the resource at a use rate that varies over time, wherein the use rate further depends on availability of other resources at the first location;
- a location sensor associated with a transporter, the transporter configured to transport the resource, the location sensor configured to determine a transporter location,
- the routing command subsystem further configured to:
  - receive information about the use rate;
  - predict an availability of the resource at a supply node;
  - detect a failure point in transportation of the resource at the supply node;
  - simulate a consequence of the predicted availability of the resource at the supply node by calculating a consequence factor;
  - compare the consequence factor to a predefined threshold;
  - when the consequence factor is not within the predefined threshold, reroute the transporter based at least in part on the amount, the use rate, and the transporter location;
  - receive first data associated with the first location and second data associated with the transporter;
  - apply a fuzzy logic to match the first data and the second data, wherein the fuzzy logic comprises matching the first data and the second data by comparing a difference between the first data and the second data to a predefined fuzzy logic threshold;
  - automatically reconcile the first data and the second data when the difference between the first data and the second data is within the predefined fuzzy logic threshold; and
  - automatically determine, for a user, the first data and the second data when the difference between the first data and the second data is not within the predefined fuzzy logic threshold; and
- a user interface configured to:
  - receive, from the user, an input to manually reconcile the first data and the second data that are automatically detected when the difference between the first data and the second data is not within the predefined fuzzy logic threshold; and
  - display, on a display device, the first data and the second data that are automatically reconciled based on the fuzzy logic or manually reconciled based on the input from the user, and the reroute of the transporter when the consequence factor is not within the predefined threshold.

64. The system of claim 63, wherein the resource comprises sand, chemicals, water, oil, gas, raw materials, finished goods, parcels, equipment, or personnel.

65. The system of claim 63, wherein the transporter comprises a rail car.

66. The system of claim 63, wherein the transporter comprises a truck.

67. The system of claim 63, wherein the amount sensor comprises at least one of a site sensor, a fracking van sensor, a sand mine sensor, a weight sensor, or a transload sensor.

68. The system of claim 63, wherein rerouting the transporter comprises routing the transporter via a transload.

69. The system of claim 63, wherein the routing command subsystem is further configured to reroute the transporter based in part on a quantity or a weight of the resource at the first location.

70. The system of claim 63, wherein the routing command subsystem is further configured to reroute the transporter based in part on a total quantity of the resource consumed at the first location.

71. The system of claim 63, wherein the routing command subsystem is further configured to reroute the transporter based in part on a predicted consumption rate at the first location.

72. The system of claim 63, wherein the routing command subsystem is further configured to reroute the transporter based in part on a predicted consumption rate at a second site.

73. The system of claim 1, wherein the consequence factor comprises a non-productive time or a demurrage.

74. The system of claim 1, wherein the first data comprises data tracked by the first location including a customer identifier, a bill of lading number, a purchase order number, a quantity of the payload, a type of the payload, a price of the payload, a time when the transporter loaded or unloaded the payload, or a transporter identifier; and
- the second data comprises data tracked by the transporter including the customer identifier, the bill of lading number, the purchase order number, the quantity of the payload, the type of the payload, the price of the payload, the time when the transporter loaded or unloaded the payload, or the transporter identifier.

75. The system of claim 1, wherein the routing command subsystem further configured to approve a first invoice from the first location and a second invoice from the transporter when the first data and the second data are automatically reconciled.

* * * * *